(12) United States Patent
Berg et al.

(10) Patent No.: US 6,888,972 B2
(45) Date of Patent: May 3, 2005

(54) MULTIPLE COMPONENT SENSOR MECHANISM

(75) Inventors: Arne Berg, Kattem (NO); Sverre Knudsen, Trondheim (NO)

(73) Assignee: Weatherford/Lamb, Inc., Houston, TX (US)

( * ) Notice: Subject to any disclaimer, the term of this patent is extended or adjusted under 35 U.S.C. 154(b) by 90 days.

(21) Appl. No.: 10/266,903

(22) Filed: Oct. 6, 2002

(65) Prior Publication Data

US 2004/0067002 A1 Apr. 8, 2004

Related U.S. Application Data

(60) Provisional application No. 60/416,932, filed on Oct. 6, 2002.

(51) Int. Cl.[7] .................................................. G02B 6/00
(52) U.S. Cl. ......................... 385/12; 385/13; 73/514.26
(58) Field of Search ................... 385/12, 13; 73/514.26, 73/152.01

(56) References Cited

U.S. PATENT DOCUMENTS

| | | | |
|---|---|---|---|
| 4,775,009 A | 10/1988 | Wittrisch et al. ........... 166/250 |
| 4,870,269 A | 9/1989 | Jeunhomme et al. | |
| 4,986,350 A | 1/1991 | Czernichow ............... 166/65.1 |
| 5,181,565 A | 1/1993 | Czernichow ................ 166/66 |
| 5,243,562 A | 9/1993 | Laurent et al. ............... 367/25 |
| 5,303,773 A | 4/1994 | Czernichow et al. ......... 166/66 |
| 5,355,952 A | 10/1994 | Meynier ..................... 166/250 |
| 5,361,130 A | 11/1994 | Kersey et al. .............. 356/345 |
| 5,401,956 A | 3/1995 | Dunphy et al. ........ 250/227.18 |
| 5,493,390 A | 2/1996 | Varasi et al. ................... 356/32 |
| 5,503,225 A | 4/1996 | Withers ................... 166/250.1 |
| 5,524,709 A | 6/1996 | Withers ................... 166/250.1 |
| 5,767,411 A | 6/1998 | Maron .......................... 73/705 |
| 5,860,483 A | 1/1999 | Havig .......................... 175/40 |
| 5,892,733 A | 4/1999 | Havig ......................... 367/188 |
| 5,925,879 A | 7/1999 | Hay ....................... 250/227.14 |
| 5,926,437 A | 7/1999 | Ortiz ............................ 367/35 |
| 6,009,216 A | * 12/1999 | Pruett et al. .................. 385/12 |
| 6,016,702 A | 1/2000 | Maron ......................... 73/705 |
| 6,049,508 A | 4/2000 | Deflandre .................... 367/48 |
| 6,072,567 A | 6/2000 | Sapack ........................ 356/32 |
| 6,151,437 A | 11/2000 | Cherbettchian et al. | |
| 6,269,198 B1 | 7/2001 | Hodgson et al. .............. 385/13 |
| 6,278,823 B1 | * 8/2001 | Goldner et al. ............. 385/100 |
| 6,385,132 B1 | 5/2002 | Sackett ....................... 367/188 |
| 6,404,961 B1 | 6/2002 | Bonja et al. ................. 385/109 |
| 6,442,304 B1 | * 8/2002 | Crawley et al. .............. 385/12 |
| 6,575,033 B1 | * 6/2003 | Knudsen et al. ......... 73/514.26 |

FOREIGN PATENT DOCUMENTS

| | | | |
|---|---|---|---|
| GB | 2 355 740 | 2/2001 | |
| WO | WO 0204984 | 1/2002 | ............ G01V/1/00 |

OTHER PUBLICATIONS

U.K. Search Report, Application No. GB 0323334.3, dated Apr. 13, 2004.

* cited by examiner

Primary Examiner—Juliana K. Kang
(74) Attorney, Agent, or Firm—Moser, Patterson & Sheridan, L.L.P.

(57) ABSTRACT

A multiple component mechanism for housing one or more fiber optic based sensors and one or more fiber organizers and other devices for the sensors is disclosed. The mechanism includes a splice component and a sensor component, which are hermetically sealed. The sensor and splice components include substantially tubular bodies having lids welded to the ends. The fiber organizer and other devices are installed in the cylindrical splice component. The one or more sensors are installed in the tubular body of the sensor component with wedging devices. In one embodiment, the sensor component is acoustically decoupled from the splice component by a tube welded to the lids of the components. The tube communicates optical fiber from the fiber organizer to the one or more sensors.

52 Claims, 14 Drawing Sheets

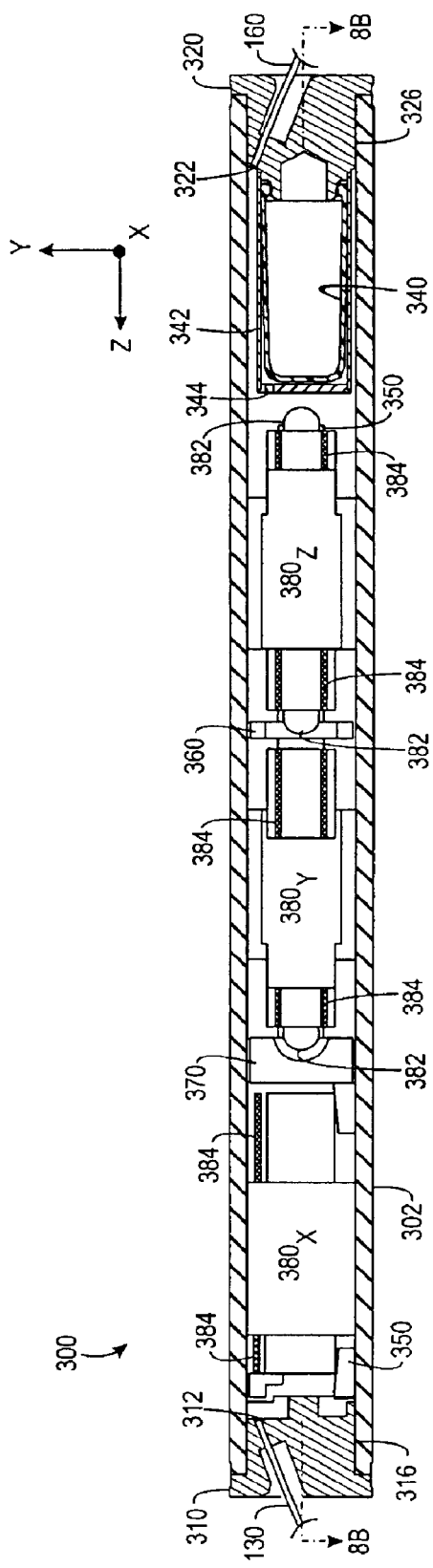

MULTIPLE COMPONENT SENSOR MECHANISM

CROSS-REFERENCE TO RELATED APPLICATIONS

This application is filed concurrently with U.S. Provisional Patent Application Ser. No. 60/416,932 filed Oct. 6, 2002, entitled "Clamp Mechanism for In-Well Seismic Sensor," U.S. patent application Ser. No. 10/266,715, entitled "Apparatus and Method for Transporting, Deploying, and Retrieving Arrays Having Nodes Interconnected by Sections of Cable;" and U.S. patent application Ser. No. 10/266,716, entitled "In-Well Seismic Sensor Casing Coupling Using Natural Forces in Wells," which contain related subject matter and are incorporated herein by reference in their entirety.

FIELD OF THE INVENTION

The present invention relates generally to a sensor for use in an array and, more particularly to a multiple component sensor mechanism for an array having fiber optic sensors.

BACKGROUND OF THE INVENTION

Sensor arrays having a plurality of sensors interconnected by sections of cable exist in the art. For example, seismology uses arrays having a number of sensors connected by sections of cable. Difficulties are encountered when the sensors and cables are assembled and when the array is deployed in a given application. In the art of seismology, for example, sensors are typically installed in the well with conventional wireline. Wireline intervention of electronically based sensors can be costly due to the costs associated with interrupting production of a well and can be risky due to the inherent risks associated with deploying coiled tubing in a well.

Other than seismic arrays, a number of other sea-bed and land applications, including geophysical streamer cables, hydrophone and thermister arrays, ocean bottom cables, towed hydrophone arrays, or other arrays can suffer from many of the same problems associated with using fiber optic based sensors for in-well seismic sensing. Namely, these applications may require numerous sensors, and the use of fiber optic connectors may be preferably minimized to reduce signal loss and back reflection. Consequently, for these applications, it may also be beneficial to pre-assemble the entire array or portions thereof before transportation to a site. Accordingly, it is beneficial to have a sensor mechanism, which can be pre-assembled, is versatile for use with various applications and devices, and is rugged enough to withstand various environments.

The present invention is directed to a multiple component sensor mechanism capable of overcoming, or at least reducing the effects of, one or more of the problems set forth above.

SUMMARY OF THE INVENTION

A multiple component sensor mechanism is disclosed. The sensor mechanism can house one or more fiber optic based sensors and can house one or more fiber organizers, among other devices for the sensors. The sensor mechanism includes one or more splice components and one or more sensor components, which are hermetically sealed. The sensor and splice components each include substantially tubular bodies having lids welded to their ends. The fiber organizers and other devices for the sensors are housed in the cylindrical splice components. The one or more fiber optic based sensors, which can be accelerometers, are housed in the sensor component with wedging devices. In one embodiment, tubes are welded between the lids of the splice and sensor components. The tubes enable the sensor component to be acoustically decoupled from the splice components and to communicate optical fiber from the fiber organizes and other devices to the one or more sensors. A second sensor component, such as a hydrophone, can be connected to one of the splice components by an additional tube.

BRIEF DESCRIPTION OF THE DRAWINGS

The foregoing summary, a preferred embodiment, and other aspects of the present invention will be best understood with reference to a detailed description of specific embodiments of the invention, which follows, when read in conjunction with the accompanying drawings, in which:

FIGS. 8A–B illustrate an embodiment of a sensor component having sensors housed therein with a plurality of wedging devices.

DETAILED DESCRIPTION OF THE INVENTION

In the interest of clarity, not all features of actual implementations of a sensor mechanism are described in the disclosure that follows. It will of course be appreciated that in the development of any such actual implementation, as in any such project, numerous engineering and design decisions must be made to achieve the developers' specific goals, e.g., compliance with mechanical and business related constraints, which will vary from one implementation to another. While attention must necessarily be paid to proper engineering and design practices for the environment in question, it should be appreciated that the development of a sensor mechanism would nevertheless be a routine undertaking for those of skill in the art given the details provided by this disclosure.

Figure 1:
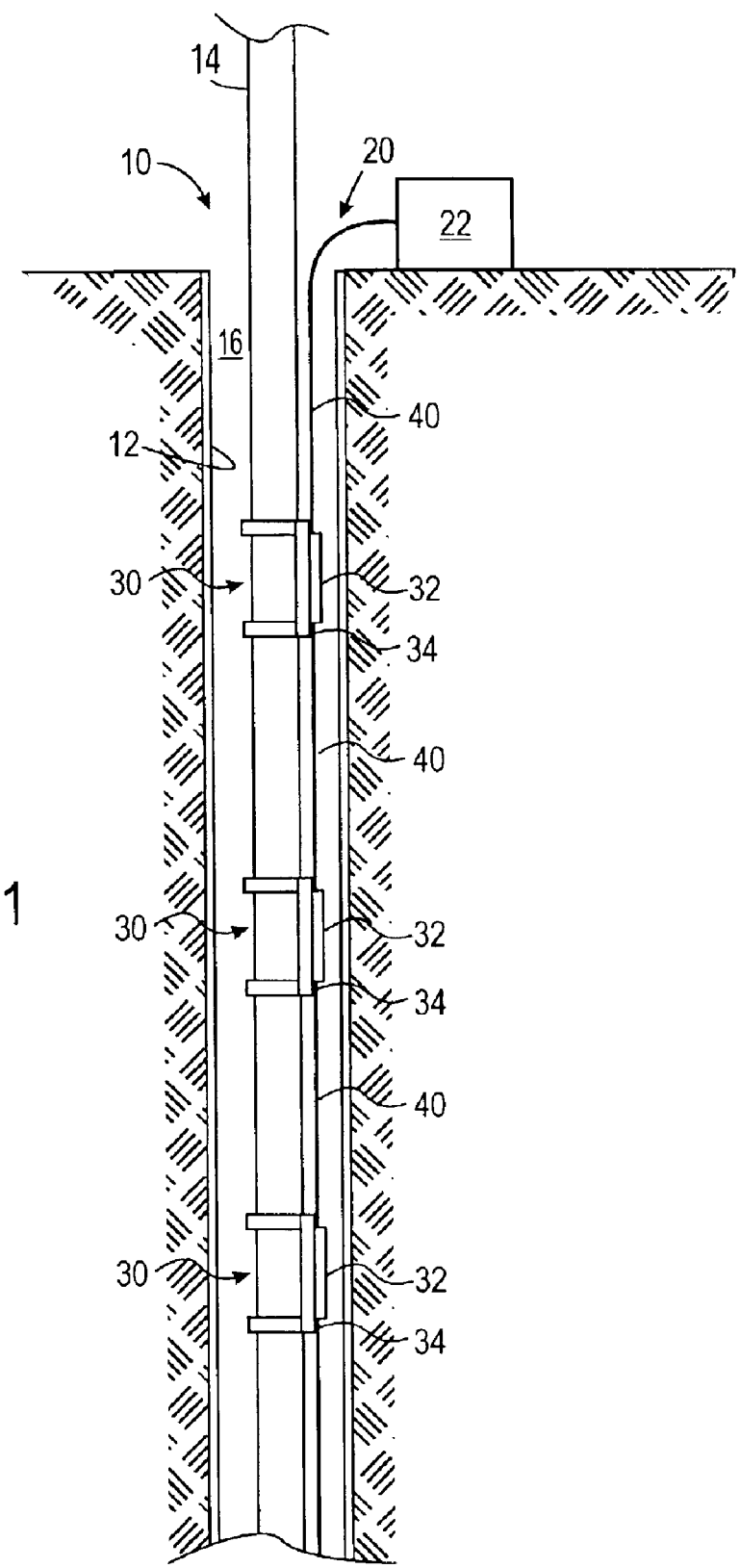
FIG. 1 schematically illustrates an array of fiber optic based seismic stations deployed in a well and connected by inter-station cables.

Referring to the schematic illustration in FIG. 1, a fiber optic in-well seismic array 20 used in the exploration of a hydrocarbon reservoir is depicted. The array 20 has a plurality of seismic stations 30 interconnected by inter-station cables 40. The array 20 is shown deployed in a well 10, which has been drilled down to a subsurface production zone and is equipped for the production of petroleum effluents. Typically, the well 10 includes a casing 12 coupled with the surrounding formations by injected cement. Production tubing 14 is lowered into the cased well 10. The well 10 can be fifteen to twenty thousand feet or more in depth, and the annulus 16 can be filled with a drilling fluid (not shown) having a high temperature and pressure, which presents an extremely corrosive and hostile environment.

The seismic stations 30 include sensor mechanisms 32 and clamps 34. The sensor mechanisms 32 are interconnected by the cables 40 to a source/sensing/data collection apparatus 22, which typically includes a demodulator and optical signal processing equipment (not shown). The cables 40 are typically ¼-inch diameter cables housing optical fibers between the sensor mechanisms 32 and the apparatus 22.

The sensor mechanisms 32 include one or more sensors (not shown), among other components as disclosed in more detail below. The clamps 34 couple the sensor mechanisms 32 to the production tubing 14, which is then lowered to a desired depth in the well 10. The clamps 34 may then be actuated to deliver the sensor mechanisms 32 so that they couple with the casing 12, which improves the sensor mechanisms' 32 ability to sense seismic events. A preferred clamp for use with a multiple component sensor mechanism of the present invention is disclosed in a U.S. Provisional Patent Application Ser. No. 60/416,932, entitled "Clamp Mechanism for In-Well Seismic Sensor," which is incorporated herein by reference. A preferred system and method for transporting, deploying, and retrieving the sensor mechanism 32 and the clamp 34 of the present invention is disclosed in a U.S. patent application Ser. No. 10/266,715, entitled "Apparatus and Method for Transporting, Deploying, and Retrieving Arrays having a Plurality of Nodes Interconnected by Sections of Cable," which is incorporated herein by reference.

As is known in the art, seismology involves the detection of acoustic waves to determine the strata of geologic features, and hence the probable location of petroleum effluents. A seismic generator (not shown) arranged at the surface or in another well is used to generate acoustic waves. Acoustic waves radiate from the source along direct paths and reflected paths through the various layers of earth. The seismic waves react to the surrounding earth layers, and these reactions (e.g., reflections) are detected by the sensors in the sensor mechanisms 32 through the casing 10 coupled to the earth. The detected signals are transmitted through the cable 40 to the source/sensing/data collection apparatus 22, which interrogates the signals.

As is known in the art of fiber optic based seismic sensing, each sensor mechanism 32 can include one or more fiber optic based sensors, containing fiber Bragg gratings (FBGs), for example, that reflect a narrow wavelength band of light having a central wavelength. If each sensor mechanism 32 has a different reflection wavelength, the reflected signals may be easily detected using Wavelength Division Multiplexing (WDM) techniques. If the sensors have the same wavelength, reflected signals can be resolved in time using Time Division Multiplexing (TDM) techniques. Such multiplexing technologies and mixtures thereof are well known in the art. For brevity, additional well-known steps, devices, and techniques employed in the methods of seismic sensing are omitted.

When performing vertical seismic profiling, the sensor mechanisms 32 of the array 20 are distributed over a known length along the production tubing 14, which can be as great as 5000 feet. Over the known length, the sensor mechanisms 32 can be evenly spaced at desired intervals, such as every 10 to 20 feet, for providing a desired resolution. Accordingly, the fiber optic in-well seismic array 20 can include hundreds of sensor mechanisms 32 and associated clamps 34. Because fiber optic connectors (not shown) on the cables 40 between the sensor mechanisms 32 can generate signal loss and back reflection of the signal, the use of such connectors is preferably minimized or eliminated in the array 20. The practical consequence of limiting the use of fiber optic connectors is that all or most of the sensor mechanisms 32 must be spliced with the cables 40 before being transported to the well 10. The details of how and where this splicing occurs in the sensor mechanism 50 are disclosed in further detail herein.

Figure 2:
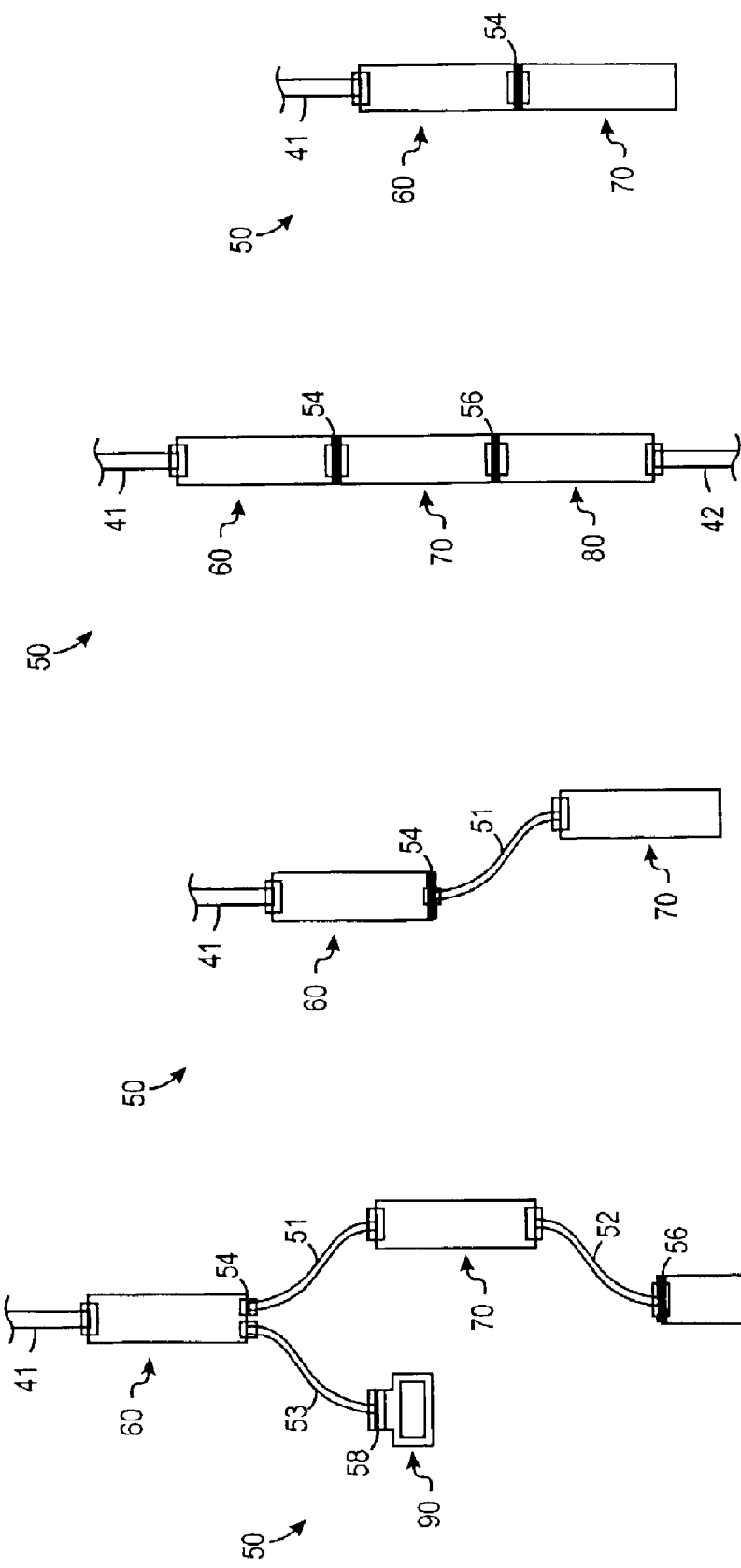
FIGS. 2A–D schematically illustrate embodiments of multiple component sensor mechanisms according to the present invention.

Referring to FIGS. 2A–D, embodiments of multiple component sensor mechanisms/seismic stations 50 are schematically illustrated. In FIG. 2A, the sensor mechanism 50 includes a first splice component 60, a sensor component 70, and a second splice component 80. A first intra-station cable 51 connects the first splice component 60 with the sensor component 70, and a second intra-station cable 52 connects the sensor component 70 with the second splice component 80. The sensor mechanism 50 can also include another sensor component 90 connected to the first splice component 60 with a third intra-station cable 53. Alternatively, the third intra-station cable 53 and other sensor component 90 need not be included in the embodiment in FIG. 2A if desired.

The cable 41 couples the sensor mechanism 50 to a source/sensing/data collection apparatus (not shown), which is well known in the art and is capable of interrogating the sensor mechanisms 50 in the array and interpreting data retrieved therefrom. Typically, this source/sensing/data apparatus resides at the top of the well (see FIG. 1, element 22). The other cable 42 can connect to other sensor mechanisms 50 or devices deployed further down on the array. Such a dual-ended sensor mechanism 50 allows several disclosed sensors mechanisms 50 to be multiplexed in series or allows the sensor mechanism 50 to be multiplexed with other fiber optic measuring or sensing devices, such as pressure sensors, temperature sensors, flow rate sensors or meters, speed of sound or phase fraction sensors or meters, or other like devices. Examples of other measuring or sensing devices are disclosed in the following U.S. patent applications, which are hereby incorporated by reference in their entireties: Ser. No. 10/115,727, filed Apr. 3, 2002, entitled "Flow Rate Measurement Using Short Scale Length Pressures"; Ser. No. 09/344,094, filed Jun. 25, 1999, entitled "Fluid Parameter Measurement In Pipes Using Acoustic Pressures"; Ser. No. 09/519,785, filed Mar. 7, 2000, entitled "Distributed Sound Speed Measurements For Multiphase Flow Measurement"; Ser. No. 10/010,183, filed Nov. 7, 2001, entitled "Fluid Density Measurement In Pipes Using Acoustic Pressures"; and Ser. No. 09/740,760, filed Nov. 29, 2000, entitled "Apparatus For Sensing Fluid In a Pipe."

If only one sensor mechanism 50 is used in an array or if the sensor mechanism 50 is the last in the array of sensor mechanisms, the second intra-station cable 52, second splice component 80, and second cable 42 need not be connected to the end of the sensor component 70, as is shown in the embodiment of FIG. 2B.

The first splice component 60 includes a substantially cylindrical housing and can house numerous fiber Bragg gratings, splices, and other structures to organize these components, as will be discussed in more detail herein. The first intra-station cable 51 connects to the end of the first splice component 60 and carries optical fiber to and from the sensor component 70. In fiber optic based embodiments, a pressure barrier 54 is provided at the connection of the first intra-station cable 51 to the first splice component 60. The pressure barrier 54 hermetically seals the sensor component 70 from the splice component 60, which allows the sensor component 70 to be filled with oil, as will be discussed in more detail herein.

The sensor component 70 is a substantially cylindrical housing and can house one or more sensors. Many different types of sensor can be used in conjunction with the disclosed sensor mechanism 50. In a preferred embodiment for in-well seismic sensing, the sensor component 70 houses one or more fiber optic based accelerometers, as will be discussed in more detail herein.

The second intra-station cable 52 carries optical fiber from the sensor component 70 to the second splice component 80. The connection of the second intra-station cable 52 to the second splice component 80 includes a pressure barrier 56 similar to that discussed above. The second splice component 80 is a substantially cylindrical housing and is substantially similar to the first splice component 60. Thus, the second splice component 80 can also house fiber Bragg gratings, splices, and other structures to organize these components. As noted above, the second section of cable 42 can be connected to other sensor mechanisms or to other devices (not shown) further down on the array. Otherwise, the second splice component 80 can have a terminated end or can be eliminated altogether as shown in FIG. 2B.

When a second sensor component 90 is used, the third intra-station cable 53 carries optical fiber between the first splice component 60 and the second sensor component 90. The second sensor component 90 is preferably a fiber optic based hydrophone, for example, but could constitute some other type of sensor, such as a fiber-optic-based pressure or temperature sensor, many of which are well known in the art. The hydrophone 90 is typically oil filled so that a pressure barrier 58 is required where the third intra-station cable 53 connects to the hydrophone 90, and a pressure barrier is not needed at the connection of the third intra-station cable 53 to the splice component 60. In an alternative embodiment, the third intra-station cable 53 could be connected to the second splice component 80 instead of the first splice component 60.

In FIGS. 2C–D, components of the sensor mechanism 50 are shown without the use of the intra-station cables (51 and 52) connected therebetween. As will be described in more detail below, the embodiments of FIGS. 2C–D can be used in applications where the sensor component 70 need not be acoustically decoupled from the other components 60 and 80 of the sensor mechanism 50.

In FIG. 2C, the first and second splice components 60 and 80 are connected to the ends of the sensor component 70. For fiber optic based embodiments, pressure barriers 54 and 56 are preferably provided between the connections to allow optical fiber to pass between the components 60, 70 and 70, 80. Again, the pressure barriers 54 and 56 allow the sensor component 70 to be hermetically sealed from the splice components 60 and 80 so that it may be filled with oil. In FIG. 2C, the sensor component 50 is dual ended and has first and second splice components 60 and 80 respectively connected to sections of intra-station cable 41 and 42 of an array. In FIG. 2D, the sensor component 50 is single ended and has only a first splice component 60 connected to a section of cable 41 of an array, and thus could represent the last station in the array.

As noted above, the multiple-component sensor mechanism 50 can be used with a number of devices or used in a number of applications, particularly as related to seismology. In one embodiment, for example, the disclosed sensor mechanism 50 can be coupled within or to a mandrel as disclosed in U.S. patent application Ser. No. 10/266,716, entitled "In-Well Seismic Sensor Casing Coupling Using Natural Forces in Wells," which is incorporated herein. In this incorporated disclosure, the mandrel containing the sensor mechanism 50 is brought into contact with the casing of a well to improve the ability of the sensor mechanism to receive seismic data. In this disclosure, the use of an integrated sensor mechanism such as those disclosed herein in FIGS. 2C–D is preferred for its robustness, low profile, and ease in handling and deployment.

In another embodiment, for example, the disclosed sensor mechanism 50 can be used with a clamp as disclosed in U.S. Provisional Patent Application Ser. No. 60/416,932, entitled "Clamp Mechanism for In-Well Seismic Sensor," which is incorporated herein. In this second incorporated disclosure, the clamp holds the sensor mechanism components, including the sensor component 70, the first and second splice components 60 and 80, and the hydrophone 90. The clamp contains mechanisms to deploy the sensor component 70 away from the clamp body and towards the casing, again improving the ability to acquire seismic data as in the more passive mandrel design described above. The splice components 60 and 80 and the hydrophone 90, however, are not deployed by the clamp and are not brought into contact with the casing. Accordingly, with this "active clamp" design, it is preferable that the sensor component 70 be flexibly attached to the splice components 60 and 80 and the hydrophone 90, i.e., by intra-station cables 51, 52, and 53, and accordingly the embodiment disclosed herein in FIGS. 2A–B would be preferred in the "active clamp" design.

The disclosed sensor mechanisms 50 and the array which concatenates them together is preferably fully assembled prior to being transported to a site, which facilitates deployment of the array in a given application. A suitable system for transporting, deploying, and retrieving the disclosed array with sensor mechanisms 50 is disclosed in U.S. patent application Ser. No. 10/266,715, entitled "Apparatus and Method for Transporting, Deploying, and Retrieving Arrays having a plurality of Nodes Interconnected by Sections of Cable," which is incorporated herein.

Figure 3:
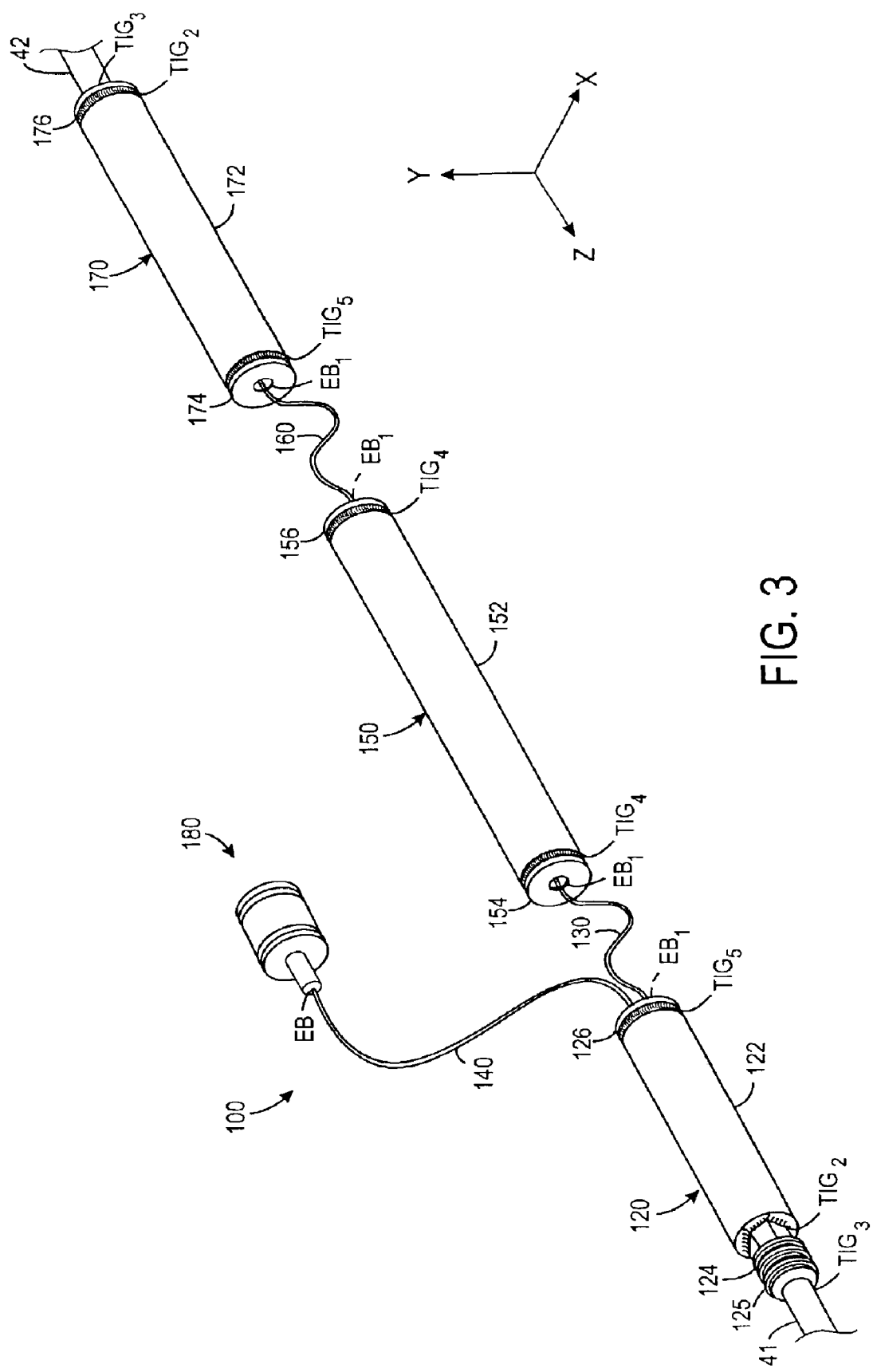
FIG. 3 illustrates a perspective view of an embodiment of a multiple component sensor mechanism according to the present invention.

Referring to FIG. 3, an embodiment of a sensor mechanism 100 is illustrated in a perspective view showing additional details. The sensor mechanism 100 includes a first splice component 120, a first tube 130, a first sensor component 150, a second tube 160, a second splice component 170, an additional tube 140, and a hydrophone 180. As noted above, in some applications, the hydrophone 180 may not be necessary. Furthermore, depending on the position of the disclosed sensor mechanism 100 on an array, the second splice component 170 and tube 160 may not be used.

The first and second splice components 120, 170 respectively include a tubular body 122, 172, a first lid 124, 176, and a second lid 126, 174. As drawn, the first lid 124 has associated with it threads for meeting with a cable termination on cable 41 which includes a nut. In this regard, the junction between the first lid 124 and the first constitutes an optical coupler, which is preferably only present on the first sensor mechanism 100 (station) of the array. Many such optical couplers are well known in the art. As mentioned, it is preferable for signal integrity purposes to minimize the number of optical fiber cable couplers in the disclosed design, but an initial coupling at the first station is practically unavoidable to facilitate deployment and transportation of the array to a work site, unless one desires to connect to the array and transport the relatively long stretches of cable that will span between the source/sensing/data collection apparatus and the array. In other words, it is preferable (although not strictly necessary) to couple the first sensor mechanism/station of the array to the surface cable at the work site. For other stations further down the array, it is preferred that they be coupled to the array using splicing techniques disclosed herein. For such stations, one skilled in the art will recognize that the disclosed sensor mechanism 100 of FIG. 3 would therefore have a first lid 124 that substantially resembles the lid 176. Thus, this disclosure proceeds to describe such a sensor mechanism without further regard to the well-known optical coupler. The first and second lids 124, 126, 174, and 176 are connected using tungsten-inert-gas (TIG) welds $TIG_2$ and $TIG_5$. As denoted by the numerical subscripts, the welds $TIG_2$ and $TIG_5$ are performed during second and fifth welding steps during the assembly of the mechanism 100. Relevant details of a process and sequence for assembling the sensor mechanism 100 are described later.

A first section of inter-station cable 41 containing optical fiber from a sensor mechanism higher up on the array or other optical device (not shown) is coupled to the first splice component 120. In a preferred embodiment, the cable 41 of the array can be an environmentally hardened capillary tube, such as disclosed in U.S. Pat. No. 6,404,961, entitled "Optical Fiber Cable Having Fiber in Metal Tube Core with Outer Protective Layer," which is incorporated herein in its entirety. The cable 41 is preferably ¼-inch in diameter and made from a corrosion-resistant metal material having a coating of material with low hydrogen permeability. Further details concerning the first cable 41 are discussed later in this disclosure. Methods and techniques for terminating or cutting the cable 41 are known in the art and are not further discussed herein for simplicity. Second cable 42, which communicates with another sensor mechanism or other device further down on the array is similarly constructed and attached to the second splice component 170, except as noted further herein.

During deployment or operation, the first lid 124 may be subject to stress due to torsion of the fiber inter-station cable 41 to which it is connected. In this regard, it may be desirable to design the first lid 124 with a more rugged construction. Consequently, the first lid 124 can be elongated in comparison to the second lid 126, i.e., it can proceed further into its body 122. Furthermore, the outside surface of the first lid 124 can be formed with a plurality of circumferential ridges 125 to be used in conjunction with a complimentarily shaped bracket or other device (not shown) for securing the end of the first splice component 120 to a clamp such as that incorporated herein. The first lid 124 can also be welded to the clamp to prevent torsion that might be caused by the connected cable 41 and to provide even further robustness. While potentially important with respect to the first lid 124, other lids disclosed herein can be similarly configured and treated.

The first and second splice components 120, 170 serve various purposes. As will be explained in further detail herein, the splice components 120, 170 can house and organize fiber Bragg gratings, the splices to those gratings, other cable splices, and other sections of excess optical fiber. Further details concerning the first and second splice component 120, 170 and their associated fibers organizer are discussed with reference to FIGS. 6 and 7 respectively. Preferably, the first and second splice components 120, 170 are not filled with pressure-compensating fluid.

Tubes 130, 140, and 160 carry optical fiber between the sensor component 150, the hydrophone 180, and the splice components 120, 170. The tubes 130, 140, and 160 are preferably composed of a metal capable of withstanding the downhole environment. Tubes 130 and 160 are preferably oil filled in the final assembly using low-pressure filling ports present in lids 126 and 174, as will be explained in more detail herein. Tubes 130 and 160 are connected to their associated lids using Electron Beam (EB) welding. The tubes 130, 160, and 170 can be approximately 1/16 or 1/8-inch diameter capillary tube composed of INCONEL or MONEL and are preferably moderately flexible, which can allow the sensor component 150 to be deployed away from the splice components 120, 170, such as is disclosed in U.S. Provisional Patent Application Ser. No. 60/416,932, entitled "Clamp Mechanism for In-Well Seismic Sensor," which is incorporated herein by reference. Bending or coiling the tubes 130 and 160 further promotes acoustic decoupling of the splice components 120, 170 from the sensor component 150.

The sensor component 150 is preferably similar in its basic structure to the splice components 120, 170, and includes a tubular body 152 and first and second lids 154, 156. As with the lids 124, 126, 174, 176 coupled to the splice components 120, 170, the lids 154 and 156 are likewise TIG welded to the body 152 and are Electron Beam (EB) welded to the tubes 130, 160. As denoted by the numeral subscript, all of the EB welds are performed during a first welding step described later.

In a preferred embodiment, the sensor component 150 is filled with oil, such as silicon oil. To compensate for thermal expansion of the oil, the sensor component 150 includes a pressure compensator (not shown) for maintaining pressure in the component 150 at preferably less than 10 bars. An embodiment of a pressure compensator is provided below with reference to FIGS. 8A–B.

As will be discussed shortly, the sensor component 150 houses one or more sensors (not shown). Many different types of sensors can be used in conjunction with the disclosed sensor mechanism 100. In a preferred embodiment for in-well seismic sensing, the sensor mechanism 100 preferably houses one or more fiber-optic based accelerometers, such as disclosed in U.S. patent application Ser. No. 09/410,634, filed Oct. 1, 1999 and entitled "Highly Sensitive Accelerometer," and Ser. No. 10/068,266, filed Feb. 6, 2002 and entitled "Highly Sensitive Cross Axis Accelerometer," which are incorporated herein by reference in their entireties. The accelerometers are preferably oriented to detect seismic activity along three orthogonal axes (x, y, and z). Relevant details of how the accelerometers are preferably housed within body 152 are discussed below with reference to FIG. 8A–11C.

In a preferred embodiment, both a main sensor component 150 and an auxiliary sensor component 180 are used in the disclosed sensor mechanism 100. The two tubes 130 and 140 for coupling these components 150 and 180 are preferably coupled to separate openings (not shown) defined in the second lid 126, although they can also be integrated at a single opening. In a preferred embodiment useful for in-well sensing, the auxiliary sensor component 180 constitutes a fiber-optic-based hydrophone for measuring acoustic signals in the well annulus, and tube 140 provides a conduit for passing optical fiber to and from the hydrophone. As one skilled in the art will understand, the acoustic signals within the well annulus as measured by the hydrophone 180 and the seismic signals measured by the sensor component 150 when coupled to the well casing can be processed to provide an accurate picture of the nature of the reservoir surrounding the borehole in which the sensor mechanism 100 is deployed. Relevant details of an embodiment of a hydrophone are discussed below with reference to FIGS. 13A–B.

The cylindrical components 120, 150, and 170 and the various lids 124, 126, 154, 156, 174, and 176 are preferably composed a strong, corrosion-resistant material such as stainless steel (e.g., ASTM UNS S17400). Such material may be plated (e.g., with gold) to improve its robustness if desired, and are suitable for TIG or EB welding. In a preferred embodiment, the outer diameters of the tubular bodies 122, 152, and 172 are in the range of approximately 25-mm and preferably have a wall thickness of about 3-mm. The lengths of the splice components 120, 170 are dictated in part by the amount of space that is need to house the various fiber structures noted above, and are preferably about 4 to 6-inches. The length of the sensor component 150 in a preferred embodiment is longer because it must hold the sensors, and is preferably about 8 to 10-inches. When so built, the components 120, 150, 170 can withstand pressures of approximately 1000 bars and temperatures of approximately 200° C. The wall thickness of the hydrophone 180 is less critical, because the body of the hydrophone 180 is not subjected to a large pressure differential as will be explained further herein. Of course, the lengths, diameters, thicknesses, and materials chosen for the components of the sensor mechanism 100 will depend on the application at issue.

Thus, as disclosed, the sensor mechanism 100 has a relatively small profile that can be integrated with a mandrel connected to the production tubing or that can be coupled to an active clamp connected to the production tubing, as further discussed in the U.S. patent applications incorporated herein. Additionally, the components 120, 150, and 170 may also be deployed outside of the well annulus in a given application.

Figure 4:
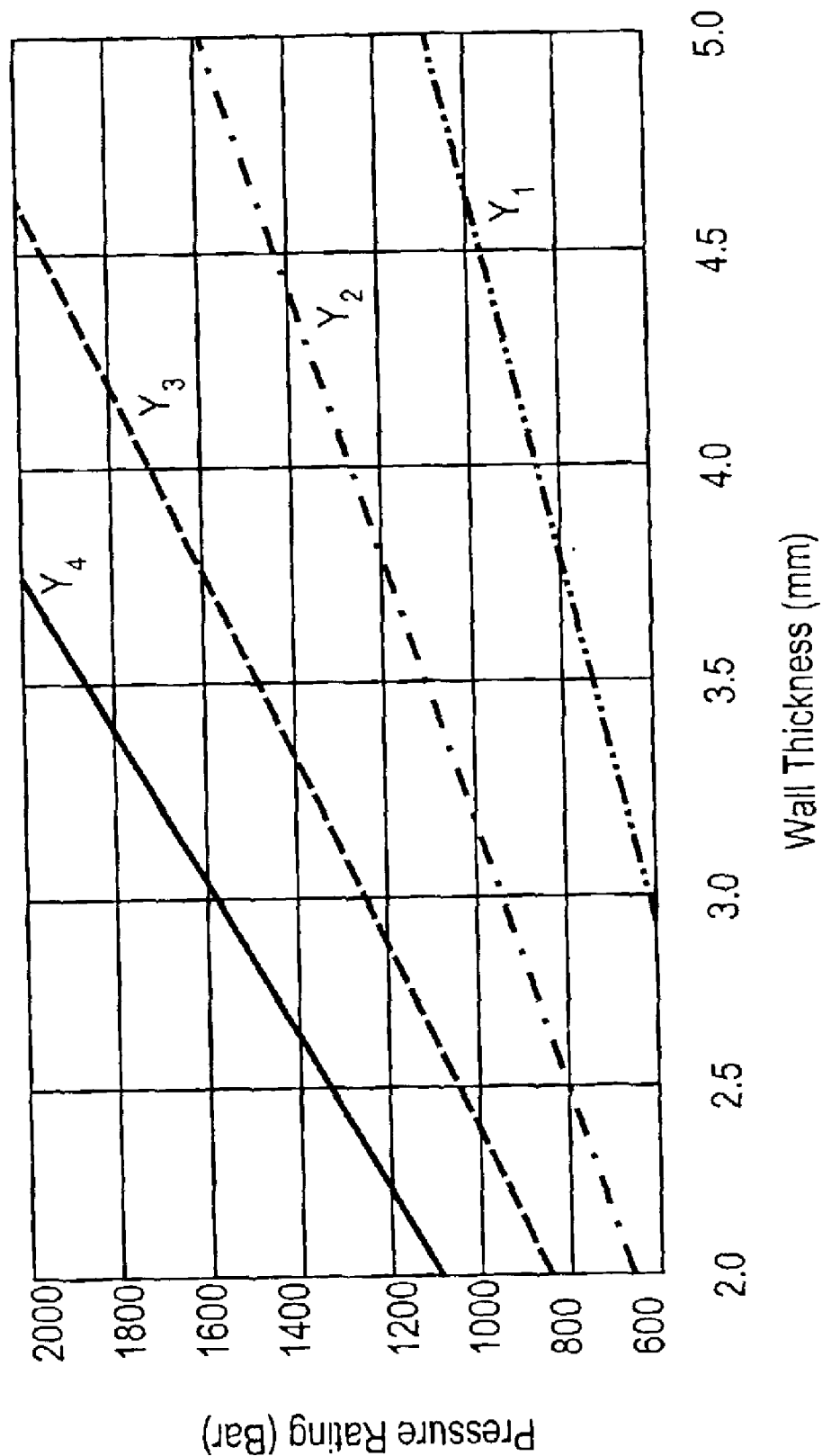
FIG. 4 illustrates a graph of pressure rating versus wall thickness for tubular housings according to the present invention.

As one skilled in the art will recognize, the wall thicknesses of the bodies 122, 152, and 172 will be selected in accordance with the pressure to which the bodies will be subject. Referring to FIG. 4, exemplary calculations of acceptable pressure ratings versus wall thickness are illustrated, and are based on an exemplary cylindrical tube with a 25-mm outer diameter and composed of exemplary materials having yield strengths of 400, 600, 800, and 1000 N/mm$^2$, which are respectively plotted as lines $Y_1$, $Y_2$, $Y_3$, and $Y_4$. Based on these or other similar graphs, appropriate wall thicknesses for materials having similar yield strengths for the tubular bodies 122, 152, and 172 can be readily chosen given the particular application and environment in which the housings are to be used. Other similar graphs can be used to similarly select appropriate materials for the tubular bodies given a particular outer diameter.

Figure 5:
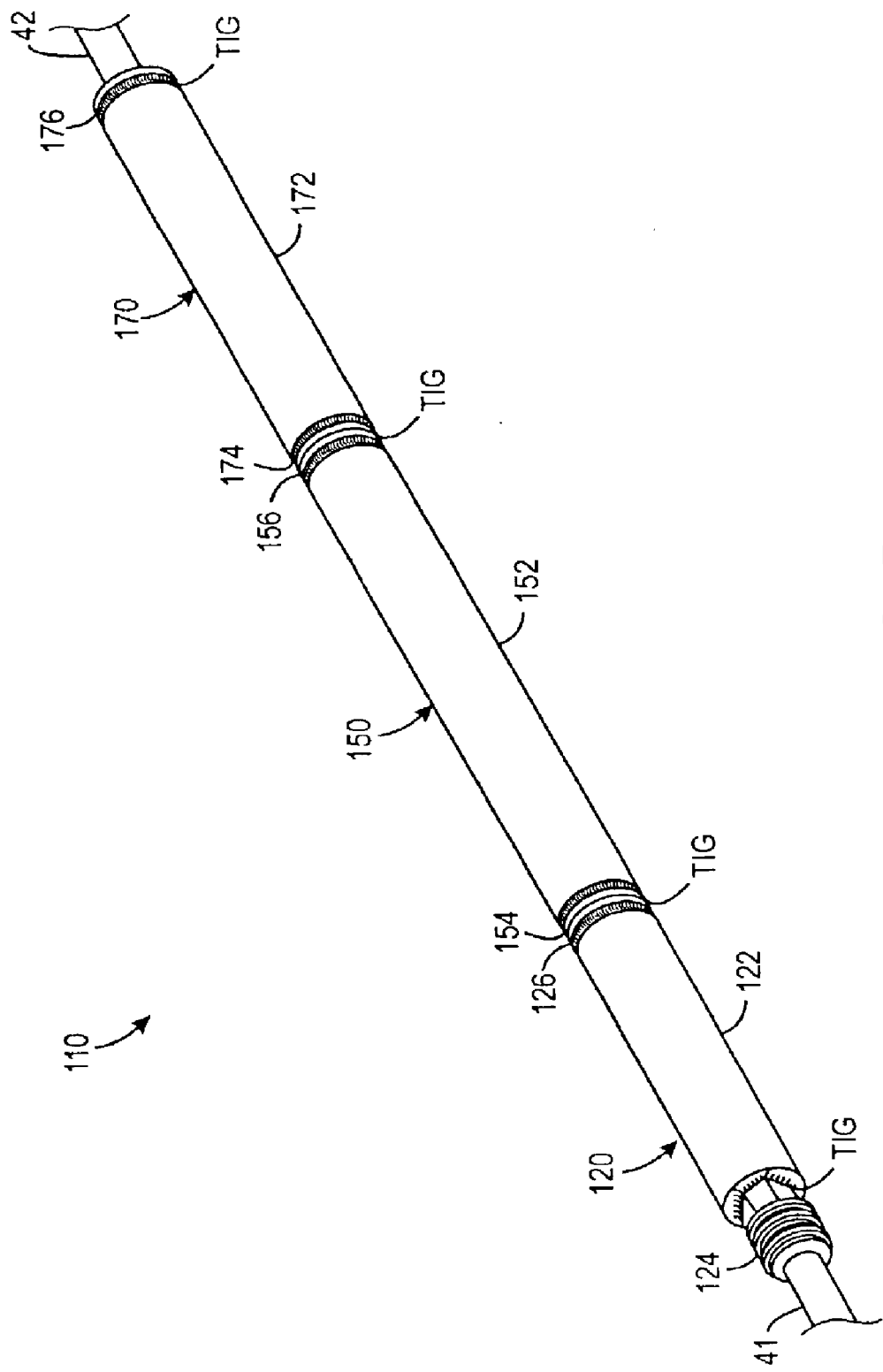
FIG. 5 illustrates a perspective view of another embodiment of a multiple component sensor mechanism according to the present invention.

Referring to FIG. 5, a sensor mechanism 110 has the first and second splice components 120 and 170 connected directly to the sensor component 150. For example, instead of interconnecting the components 120, 150, and 170 with tubes 130 and 160, the lids 126 and 154 and the lids 156 and 174 can be welded directly together using techniques disclosed herein. Alternatively, dual sided lids can be made and welded between the tubular bodies 122, 152, and 172. Likewise, it is not strictly necessary that the splice components 120, 170 and the sensor component 150 be individually formed, and instead these components can be integrated within a single integral housing.

Figure 6A:
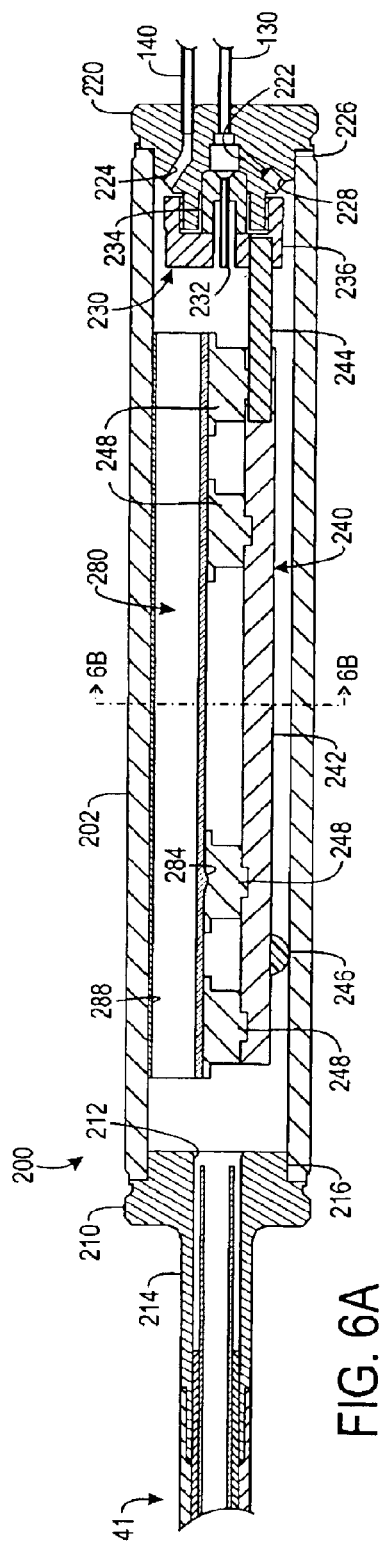
FIGS. 6A–C illustrate an embodiment of a first splice component for the disclosed sensor mechanism having an embodiment of a fiber organizer and a fiber-stacking device housed therein.
Figure 6B:
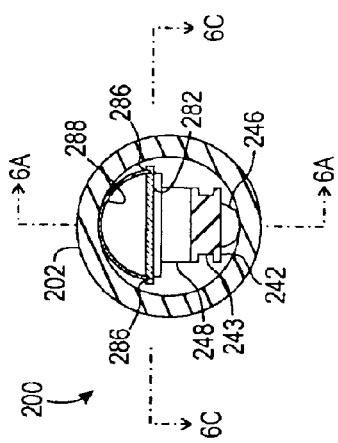
Figure 6C:
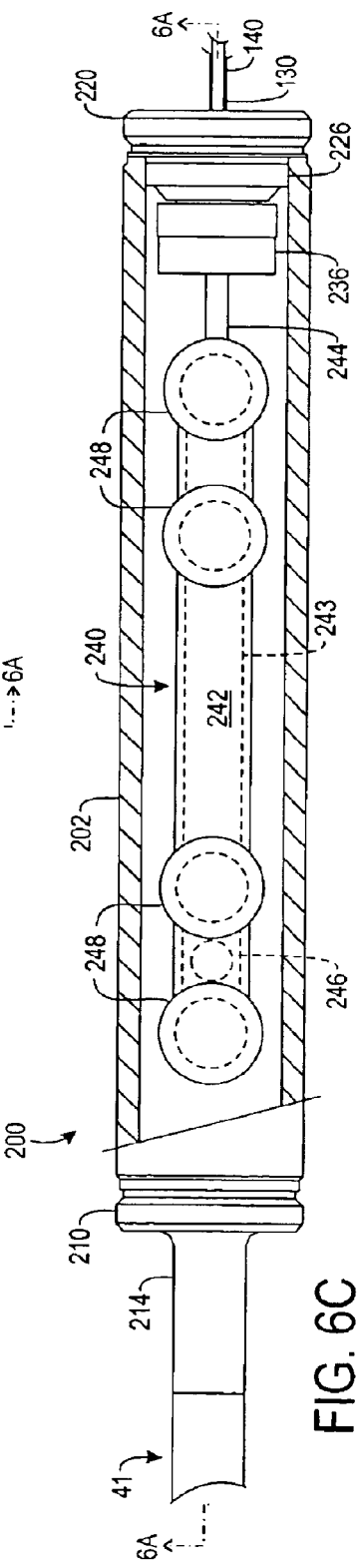

Referring to FIGS. 6A–C, an embodiment of a first splice component 200 for the disclosed sensor mechanism is respectively illustrated in a side cross-sectional view, a middle cross-sectional view, and a top cross-sectional view. For example, the present embodiment of the first splice component 200 can correspond to the first splice component 120 of FIG. 3. As described above, the splice component 200 includes a tubular body 202, a first lid 210, and a second lid 220. Also visible are a fiber feedthrough 230 and a fiber organizer 240. The first lid 210 is welded to an end of the tubular body 202 using techniques disclosed herein. The first lid 210 has an opening 212 therethrough, an extension 214, and a shoulder 216. The shoulder 216 positions approximately 4.5-mm within the tubular body 202 with an interference fit, which facilitates the welding of these components as will be described below. The extension 214 is connected to a section of cable 41 from an array by methods and techniques known in the art. Fiber optic cable includes an inner metal tube, a polymer-based buffer material, and an outer metal tube. The inner tube is composed of a corrosion-resistant metal having a coating of material with low hydrogen permeability. The area of the inner tube not occupied by the optical fibers may be filled with a filler material (not shown). Although not shown for clarity, optical fiber(s) passes from the section of cable 41, through the opening 212, and to the fiber organizer 240 housed in the splice component 200.

The second lid 220 has an opening 222, an auxiliary opening 224, a shoulder 226, and a filling port 228. The opening 222 passes optical fiber through a fiber feedthrough 230 and its associated tubular member 232 from the fiber organizer 240 to the sensor component (not shown) via tube 130, which is connected to the second lid 220 using methods and techniques disclosed herein. Once the optical fibers are passed therethrough, the tubular member 232 can be sealed with epoxy, glass, or other sealing material known in the art depending on the intended pressure and temperature to be encountered. The auxiliary opening 224 passes optical cable (not shown) to tube 140 that connects to a hydrophone (not shown) if used. The filling port 228 communicates with the opening 222 and is used to fill the tube 130 and sensor component (not shown) with oil during assembly as will be explained. The second lid 220 is attached by welding in the same manner as the first lid 210.

The fiber feedthrough 230 is attached to the side of the second lid 220 at end member 234 using nut 236. The feedthrough 230 includes a tubular member 232 for passing optical fiber to and from the fiber organizer 240. The tubular member 232, end member 234, and attachment member 236 are preferably composed of a stainless steel similar to that used for the lids 210 and 220.

The fiber organizer 240 includes a first tray member 242, a connection member 244, a damping support 246, and a plurality of winding members 248 around which optical fiber and it associated splices can be arranged. The first tray member 242 is preferably flat and composed of aluminum. As shown in FIG. 6C, the tray member 242 defines a groove 243 along its sides as another location at which fiber optics can be organized. The connection member 244 attaches the first tray member 242 to the fiber feedthrough 230. The damping support 246 is preferably a semi-spherical knob attached to the underside of the first tray member 242 and composed of a polymer. The damping support 246 contacts the cylindrical inner surface of the tubular body 202 to dampen movement of the first tray member 242.

Two pairs of winding members 248 are attached to the first tray member 242. Each member 248 in a pair is separated by approximately 20-mm from center to center, and the outside members 248 are separated by about 88-mm, although these dimensions can be easily changed as necessary. As so sized, the winding members 248 can hold several meters of 125-micron optical fiber. As arranged, optical fiber can be wound around the member 248 in many different ways, either around both pairs individually, or around the entirety of the winding members, which provides flexibility for the assembler to organize the optical fibers in whatever fashion might be warranted for a given application.

As will be described in further detail herein, at some point in the manufacturing process final fiber splices will need to be placed in the splice component 200 after the fiber organizer 240 has been placed in its tubular body 202. At this point, the fiber organizer 240 will likely not be accessible to the assembler, and space will need to be provided to stuff the remaining splices into the tubular body 202. Accordingly, a fiber-stacking device 280 is affixed to the top of the winding members 248, preferably by epoxy and after certain fiber optics have been arranged on the members 248. The fiber-stacking device 280 includes a second tray member 282 and a second support 288. The second tray member 282 can be composed of metal, and the second support 288 is preferably composed of steel that is approximately 0.2-mm thick and flexible. The second tray member 282 is located on the winding members 248 by positioning one or more nodules 284 in respective detents defined in the tops of winding members 248. When inserting the fiber organizer 240 and the fiber stacking device 280 into the tube, the support 288 is positioned in channels 286 defined along the edges of the second tray member 282, allowing the support 288 to act essentially as a spring against the inside of the tubular body 202.

Figure 7A:
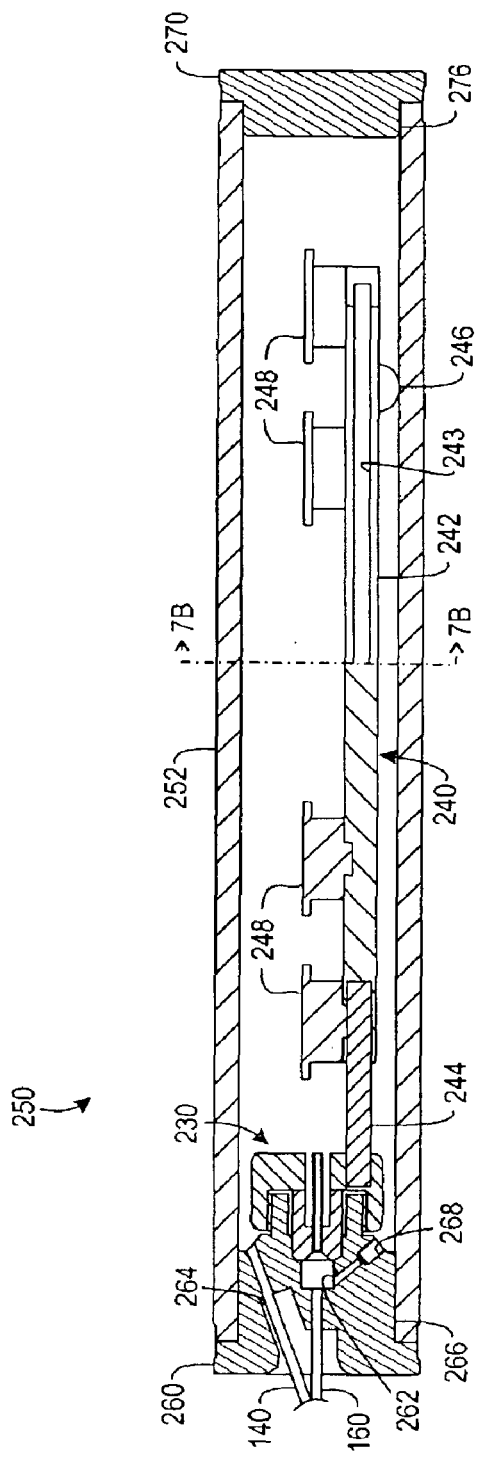
FIGS. 7A–B illustrate an embodiment of a second splice component for the disclosed sensor mechanism having a fiber organizer housed therein.
Figure 7B:
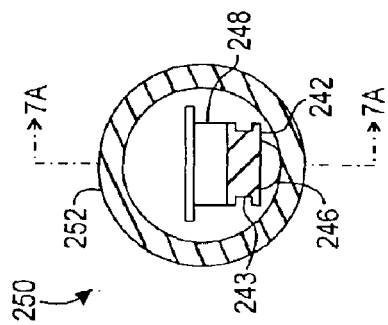

Referring to FIGS. 7A–B, an embodiment of a second splice component 250 is illustrated in a side and a middle cross-sectional view, respectively. The present embodiment of the second splice component 250 can correspond to the second splice component 170 of FIG. 3, for example. As shown, however, the second splice component 250 represents a splice component that might be located at the end of a sensor array as it is single ended and not connected to cable 42. Because it is single ended, a fiber stacking device 280 is not strictly necessary as final splice need not be accommodated, although it could be included for stability if desired. Were the second splice component 250 dual-ended and located at an intermediate station along a sensor array, it would largely appear as the mirror image of the first splice component 200 of FIG. 6A–C, for example.

The second splice component 250 is generally the same as the first splice component 200 described above, and hence similar structures and their functions and construction are not reiterated here. As noted earlier, the second splice component 250 connects with tube 130 that connects to the sensor component 150, which is described in further detail below. An auxiliary opening 264 is formed in lid 260 should it be desirable to couple the auxiliary sensor (e.g., hydrophone) via tube 140 to the second splice housing 250 instead of to the first splice housing 200. As in the first splice housing, a filling port 268 is provided, which, in conjunction with filling port 228 (FIG. 6A) can be used to fill tubes 130, 160 and the sensor component 150 with oil as described earlier.

FIGS. 8A–8B illustrate an embodiment of a sensor component 300 for the disclosed sensor mechanism 100. The sensor component 300 can correspond to the sensor component 150 of FIG. 3, for example. In FIG. 8A, the sensor component 300 is shown in a first cross-sectional view. In FIG. 8B, the sensor component 300 is shown in a second cross-sectional view oriented 90-degrees relative to FIG. 8A. The sensor component 300 includes a tubular body 302 and first and second lids 310, 320, which are preferably TIG welded to the body 302 as will be explained in more detail later. The shoulders 316, 326 of the lids 310, 320 are preferably positioned further inside of the body 302 (e.g., approximately 12-mm) than are the lids of the splice components in recognition of the fact that the lids 310, 320 will be welded to the body 302 when the optical fibers are present. Hence, a larger shoulder is preferred to prevent heat damage to the optical fibers, as will be explained in more detail herein.

As with the splice components 200, 250, the tubes 130, 160 that carry optical fiber between the sensor component 300 and the splice components 200, 250 are EB welded to the lids 310, 320 as will be explained in further detail below. Openings 312, 322 allow for the passage of optical fibers to and from the sensor component 300. In recognition of the fact that the sensor component may be deployed away from the splice components 200, 250, e.g., when used with a releasable clamp mechanism, the openings 312, 322 are angled to reduce stress on the connection with tubes 130, 160. The lids 310, 320 do not require filling ports as filling of the inside of the sensor component 300 with oil is preferably accomplished at the inside lids 220, 260 of the splice components 200, 250.

The sensor component 300 houses a pressure compensator 340, three sensors 380x, 380y, and 380z, and a plurality of wedging devices 350, 360, and 370. When the sensor component 300 is used in a well, temperatures outside the sensor component 300 can cause the oil in the sensor component 300 to expand and elevate the pressure inside the sensor component 300 beyond acceptable levels for the sensors 380x, 380y, and 380x. The pressure compensator 340 is included to mitigate such undesirable pressure increases inside the sensor component 300 and to maintain the pressure within the component to approximately 5 to 10 bar. The pressure compensator 340 constitutes a gas-filled bladder composed of rubber or other material that compresses when the oil expands. A metal barrier 342 defines one or more openings 344 for oil to pass therethrough to allow excessive pressure to be taken up by the bladder 340. The metal barrier 342 also surrounds the compensator 340 to prevent damage to optical fiber passing between the sensor 380z and the opening 322.

Many different types of sensors can be used in conjunction with the disclosed sensor component 300. In a preferred embodiment, the sensor component 300 houses one of more fiber optic based sensors 380x, 380y, and 380z so that additional electronics are not required. The use of fiber optic sensors 380x, 380y, and 380z in the sensor component 300 is preferred because of their resilience, reliability, and ability to be easily multiplexed along a single optical fiber.

A suitable fiber optic based sensor for use in seismic sensing includes an accelerometer, such as disclosed in the following U.S. patent application Ser. No. 10/068,266, filed Feb. 6, 2002, entitled "Highly Sensitive Cross-Axis Accelerometer," and Ser. No. 09/410,634, filed Oct. 1, 1999, entitled "Highly Sensitive Accelerometer," which are incorporated herein by reference in their entireties. The accelerometer incorporated herein is less than 1-inch in diameter and less than approximately 2-inches in length.

In the present embodiment, three fiber optic based accelerometers $380_x$, $380_y$, and $380_z$ are housed in the sensor component 300, although more or less accelerometers may be present depending on the application and dimensions of the body 302. The first and second accelerometers 380x and 380y are cross-axis accelerometers, which measure acceleration perpendicularly to the central axis of the sensor mechanism. The first and second accelerometers 380x and 380y arranged at 90-degrees with respect to each other and which are capable of measuring accelerations along the x and y-axes. The third accelerometer is a z-axis accelerometer capable of measuring acceleration parallel to the central axis of the sensor mechanism.

As one skilled in the art will understand, each sensor 380x, 380y, and 380z includes an input optical fiber and an output optical fiber. During manufacturing, these fibers must be spliced to multiplex the sensors together, which can result in excess cable being present within the sensor component 300, as will be explained in more detail later. To organize these optical fibers (and potentially their splices), each sensor 380x, 380y, and 380z includes one or more curved fiber supports 382 and two polyamide tubes 384. Fiber can be wound around the curved surface of the fiber supports 382 and the fibers fed through the polyamide tubes 384 to secure a winding of optical fiber within the sensor component 300. In this regard, the polyamide tubes 384 are approximately 0.7-mm to allow 125-micron optical fiber to pass therethrough several times.

Additionally, the polyamide tubes 384 need not simply hold a winding of cable corresponding to its associate sensor. Instead, the tube should be viewed as numerous potential conduits for passing optical fiber through the sensor component 300. For example, in a particular application, it may not be possible for a single optical fiber to communicate with all of the sensor stations along a seismic array, as attenuation of the signal will eventually take its toll. Suppose for example that only twenty-five sensor stations can be multiplexed along the same optical fiber. In an array of one-hundred sensor stations, therefore, four optical fibers will be passed from the surface of the well. This means that certain optical fibers will preferably simply pass through a given sensor station, and hence a given sensor component 300. In recognition of that fact, the fiber can simply be fed through the sensor component 300 by passing it through which ever tube 384 is most accessible and most convenient, realizing that the optical fiber can only be bent so far before it begins to crack or exhibits negative optic effects. In summary, the tubes 384 and fiber supports 382 provide flexibility in positioning optical fiber as desired within the sensor component 300 for a given application.

Further assisting in the routing of the optical fiber within the sensor component 300 are the wedging devices 350, 360, and 370, which serve numerous purposes in the sensor component 300. First, as alluded to, the wedging devices are shaped so to define regions where the optical fiber may pass between sensors 380 or between a sensor and the openings 312, 322. Second, the wedging devices take up space within the cavity to minimize the amount of oil therein, which, in connection with the pressure regulator 340, mitigates the effect of oil swelling within the sensor component 300. Third, the wedging devices are used to hold and correctly orient the accelerometers 380x, 380y, and 380z with respect to the body 302.

Three different types of wedging devices 350, 360, and 370 can be used depending on the number of sensors to be housed in the sensor component 300 and depending on the orientation that the sensors are intended to have within the component 300. The disclosed shapes for the wedging devices 350, 360, and 370 are merely illustrative and could easily be changed by those skilled in the art to realize the beneficial functions disclosed herein. The wedging devices 350, 360, and 370 are composed of a suitable metal, and preferably the same material as the tubular body 302 to promote proper thermal matching between the two.

The wedging devices 350, 360, and 370 are positioned at the ends of and between the sensors 380x, 380y, and 380z inside of the tubular body 302, and preferably two wedging devices are used for each sensor 380x, 380y, and 380z. The pressure fit provided by the wedging devices 350, 360, and 370 must be able to withstand substantial shock forces, such as 1000 G, so that the sensors 380x, 380y, and 380z do not become dislodged in the tubular body 302 during deployment and retrieval. As noted, because the sensor component 300 is filled with oil, which tends to expand considerably as temperature increases, some of the wedging devices 360 and 370 include portions to fill the open space within the sensor component 300 and to reduce the amount of oil therein.

Figure 9A:
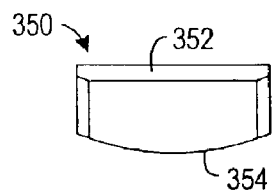
FIGS. 9A–12 illustrate various wedging devices for use in the sensor component of FIG. 8A–B.
Figure 9B:
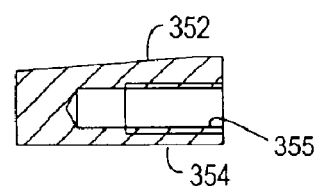

Relevant details of the different wedging devices are illustrated in FIGS. 9A–12. Referring to FIGS. 9A–B, the first wedging device 350 is shown in an end view and a side cross-sectional view. The first wedging device 350 defines an inclined surface 352 on one side and defines a cylindrical surface 354 on the other side. The inclined surface 352 is oriented at approximately 5-degrees to a level plane. The cylindrical surface 354 is curved to fit the inner radius of tubular body 302 of the sensor component. The wedging device 350 also defines a threaded hole 355, which is used with a threaded screw to attach to the device 350 and remove it when disassembling the sensor component 300. The first wedging device 350 is intended as an end wedging device for the sensors. As shown in FIGS. 8A–B, first wedging devices 350 are positioned at the end of the first sensor 380x and at the end of the third sensor 380z adjacent the lids 310 and 320.

Figure 10A:
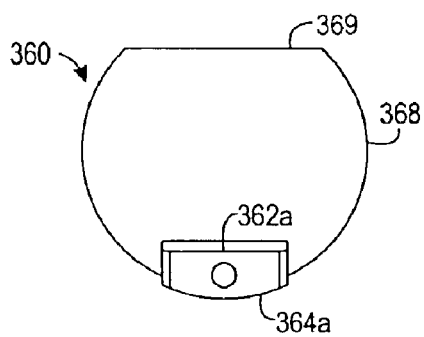
Figure 10B:
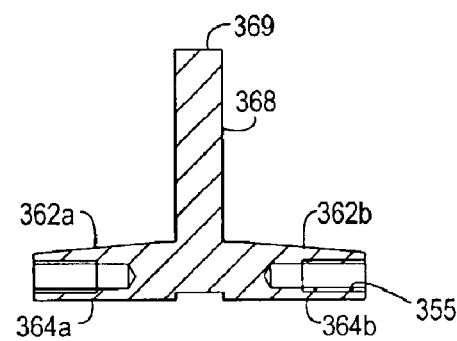
Figure 11A:
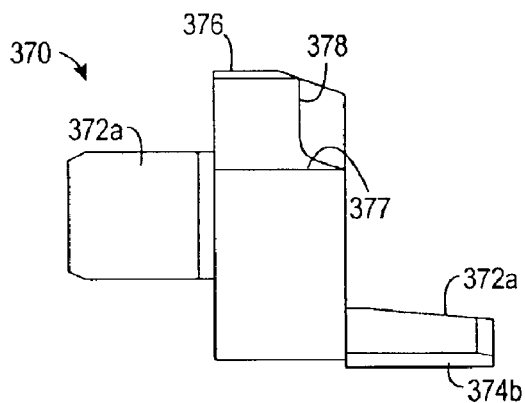
Figure 11B:
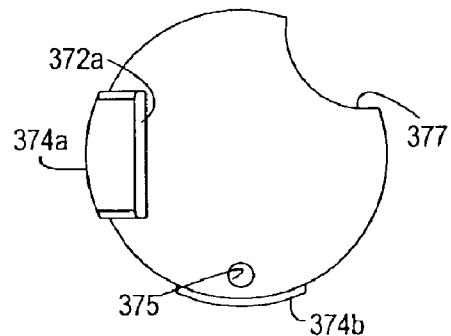
Figure 11C:
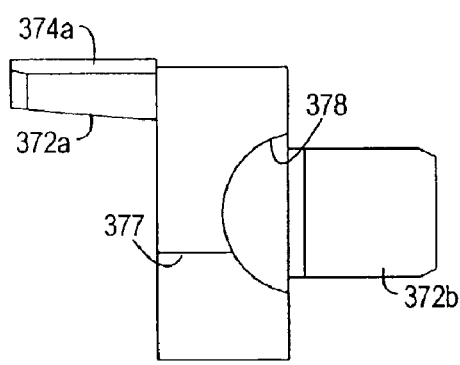
Figure 12:
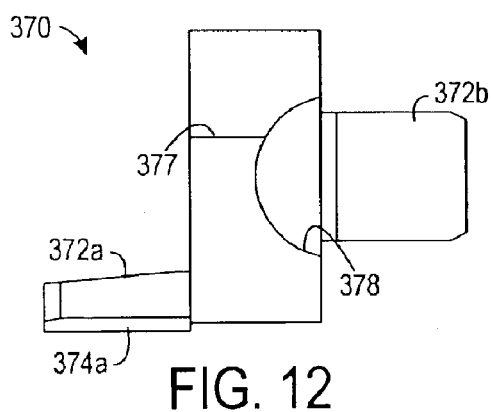

Referring to FIGS. 10A–B, a second, dual-ended wedging device 360 is shown in an end view and a side cross-sectional view. The second wedging device 360 defines first and second inclined surfaces 362a–b on both ends oriented at approximately 5-degrees to a level plane. The second wedging device 360 also defines cylindrical surfaces 364a–b for mating with the inner radius of the tubular body 302. The second wedging device 360 includes an intermediate portion 368 for taking up space within the body 302 and accordingly limiting the amount of oil required in the sensor component. The intermediate portion 368 has a flat surface 369 to accommodate a fiber support (element 382 in FIGS. 8A–B) between sensors and to allow optical fiber to pass from one side of the wedging device 360 to the other. The second wedging device 360 is intended as an intermediate wedging device between adjacent sensors in the sensor component. As shown in FIGS. 8A–B, the second wedging device is positioned between the second and third sensors $380_y$ and $380_z$.

Referring to FIGS. 11A–C and 12, a third wedging device 370 is shown in a side view, an end view, and a plan view. The third wedging device is used between the first and second sensors $380_x$ and $380_y$, which have fiber supports 382 and polyamide tubes 384 oriented at 90-degree with respect to each other (see FIGS. 8A–B). Accordingly, this wedging device 370 is necessarily of a more complicated design to appropriately match the wedge location with the other wedge on the outside edges of the first and second sensors, and to allow optical fiber to pass between the first and second sensors (and their associated fiber supports 382 and polyamide tubes 384). The third wedging device 370 has inclined surfaces 372a–b and cylindrical surfaces 374a–b. The surfaces 372a–b and 374a–b are offset at 90-degrees relative to one another. As evidenced by the third wedging device 370 in FIG. 12, the surfaces 372a–b and 374a–b can be offset at an alternative 90-degrees relative to one another. An intermediate portion 376 separates the surfaces 372a–b, and limits the amount of oil required in the sensor component. The intermediate portion 376 contains a first recess 377 to accommodate passage of optical fiber from one side of the wedging device 370 to the other. The intermediate portion 376 also defines a second recess 378 to accommodate a fiber support of a sensor. The dual recesses 377 and 378 thus allow for routing fiber from one side of the wedging device to the other at the 90-degree turn. To properly transfer the fiber around the 90-degree bend from one side of the intermediate portion 376 to the other side, additional polyamide tubes may be required for protecting the fiber and to prevent micro-bends in the fiber.

Figure 13A:
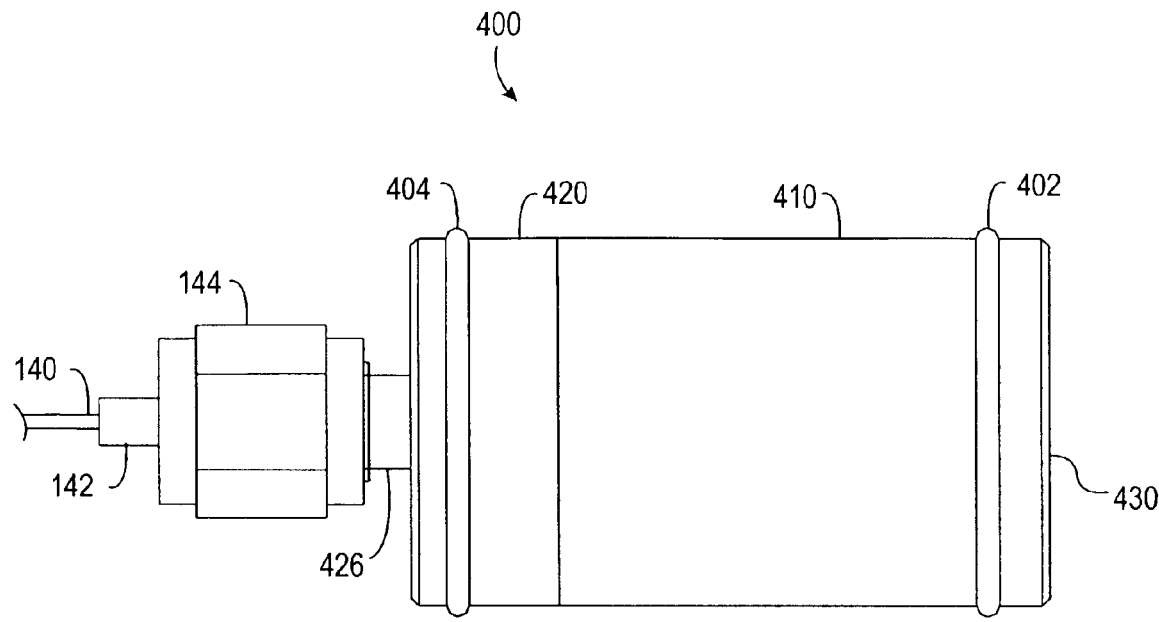
FIGS. 13A–B illustrate an embodiment of a hydrophone for the disclosed sensor mechanism.
Figure 13B:
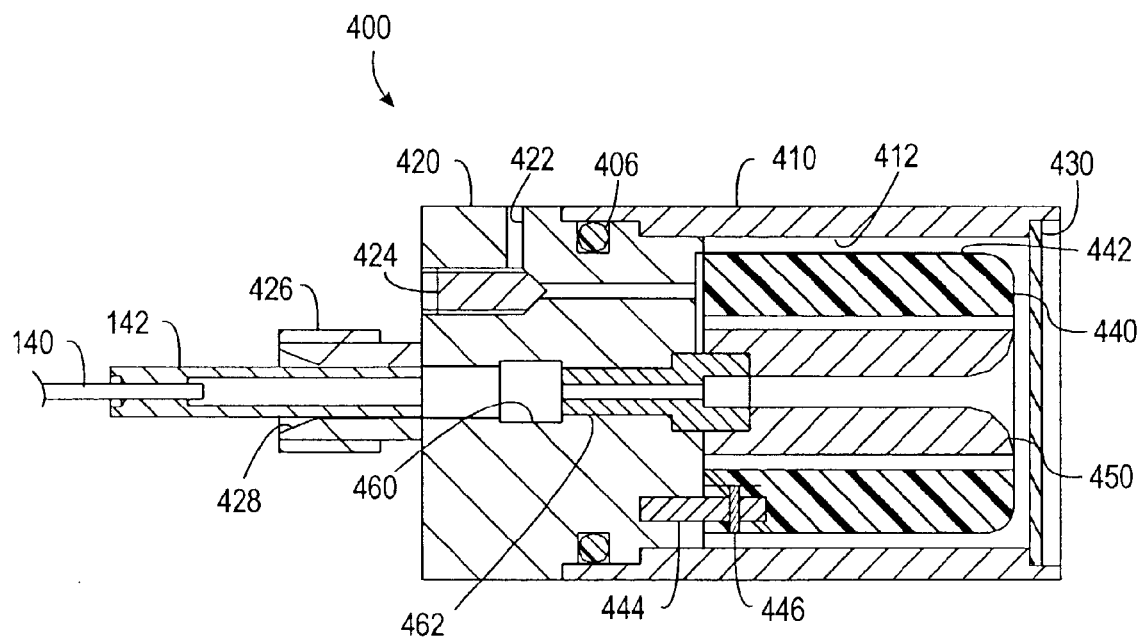

As noted earlier, it is preferred to use an auxiliary sensing device, such as a hydrophone, in conjunction with the disclosed sensor mechanism. Referring to FIGS. 13A–B, an embodiment of a hydrophone 400 for use with the multiple component sensor mechanism of the present invention is illustrated in a side view and a cross-sectional view, respectively.

In a preferred embodiment, the hydrophone 400 is designed to couple directly to the well fluids in the annulus between the production pipe and the well casing, and hence is subject to high pressure and temperatures. Because these conditions can be deleterious to the fiber optic sensor within the hydrophone, the optical fiber is not directly exposed to the well fluids, but is instead acoustically coupled to the well fluid through oil within the hydrophone and a flexible membrane 430, both of which transmit acoustics from the well fluids to the fiber optic sensor.

The hydrophone 400 includes a tubular portion 410, an end portion 420, and, as noted, a flexible membrane 430. The tubular portion 410 and end portion 420 are connected together and preferably composed of stainless steel, INCONEL, or other material suitable for the environment to be encountered. O-rings 402 and 404 are disposed about the outside of the hydrophone 400 for decoupling the hydrophone from a device used to hold the hydrophone, such as the clamp incorporated herein.

The tubular portion 410 defines an inner chamber 412 and connects to the end portion 420. An O-ring 406 can be used at the connection of the portions 410 and 420, because the hydrophone 400 does not experience a substantial pressure differential between the chamber 412 and the outside of the hydrophone 400.

The flexible membrane 430 is coupled to one end of the tubular portion 410 to cover the inner chamber 412. The membrane 430 transfer acoustic signals from outside the hydrophone 400 to the sensor 440 housed within the chamber 412. The flexible membrane 430 is a thin disk and can be made of stainless steel or other suitable material for the intended environment. The flexible membrane 430 can define a plurality of circumferential ridges (not shown) to facilitate bending of the membrane. The thickness of the member is selected depending on a number of variables, including the expected temperature and pressure in the intended environment. The flexible membrane 430 is preferably welded to the tubular portion 410. Because the flexible membrane 430 is substantially flat and small, a laser weld is the preferred procedure to weld the membrane 430 to the tubular portion 410, but this is not strictly necessary.

The end portion 420 is attached to the other end of the tubular portion 410 to enclose the chamber 412. The end portion 420 defines a filling port 422 for filling the chamber 412 with silicon oil, and a screw 424 is used to plug off the filling port 422 after filling. (Although not shown, another filling port and screw are provided in the end portion 420 and are used as a vent when filling the chamber 412). The end portion 420 also includes a threaded extension 426 defining an opening 428 for attaching to the tube 140 from the first splice component 120, 200. As best shown in FIG. 13B, a tubular extension 142 is attached to the end of the tube 140 and is then attached to the opening 428 in the threaded extension 426 using techniques disclosed herein. As best shown in FIG. 13A, a locking nut 144 is then threaded onto the threaded extension 426.

The sensor element in the chamber 412 includes an optical fiber winding (not shown for clarity) around and bonded to a surface 442 of a cylindrical mandrel 440. The mandrel 440 is preferably composed any of several well-known polymers which can withstand high temperatures and pressures. A first pin 444 is mounted on the end portion 420 and extends into the mandrel 412. To hold the mandrel 440 on the first pin 444, a second pin 446 is positioned through the mandrel 440 and the first pin 444. Other similar pin arrangements appearing around the circumference of the mandrel are not shown for clarity.

Because the chamber 412 is filled with silicone oil that can expand due to thermal effects, a cylindrical member 450 is disposed in the chamber 412 to reduce the volume of oil required. The cylindrical member 450 is preferably composed of the same material as the tubular portion 410 and end portion 420, but could be another material having a substantially equivalent coefficient of thermal expansion.

The end portion 420 defines an opening 460. An optical feedthrough 462 communicates optical fiber from the tube 140 to the mandrel 440 in the chamber 412. Because the interior of the chamber 412 will be subject to high pressures, the interface between the tube 140 and the hydrophone chamber 412 requires a high-pressure barrier. To effectuate this, the optical feed through 462 is typically sealed by an epoxy or other sealant known in the art after the fiber optic sensors have been positioned. The principles of how fiber optic windings can be used to detect acoustic pressures are not further discussed.

Having disclosed the basic mechanical aspects of the disclosed sensor mechanism 100, this disclosure now turns to a discussion of the optical circuitry contained therein. In this regard, FIGS. 14A–B disclose schematic illustrations of optical circuits and their locations in the sensor mechanism 100, with reference to the elements numerals used with respect to FIG. 3 and 6–8.

Figure 14A:
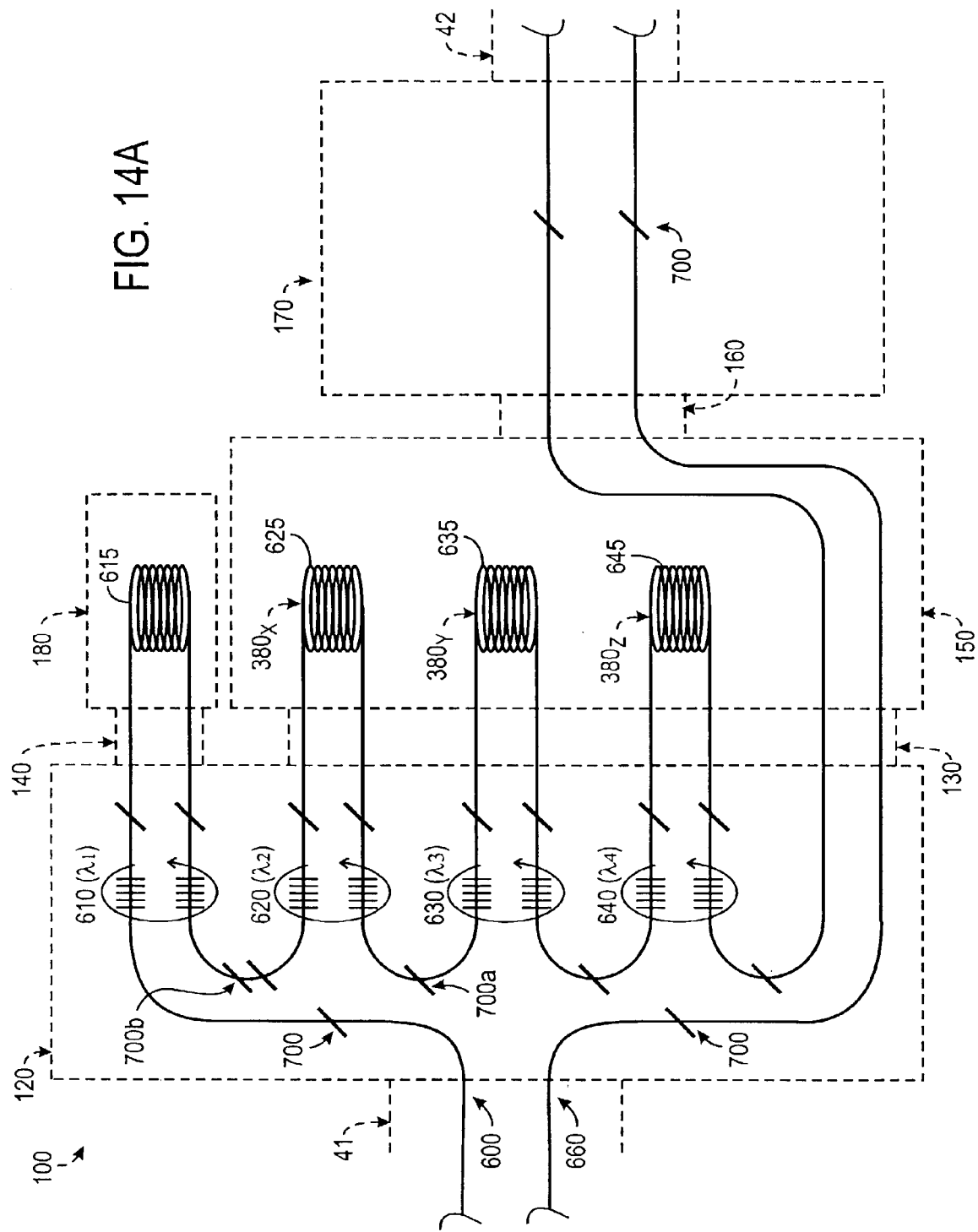
FIGS. 14A–B illustrate exemplary optical circuits that can be implemented with the disclosed sensor mechanism.

An exemplary optical circuit constituting a single fiber optic pathway 600 is shown in FIG. 14A. As will be appreciated by one skilled in the art, the hydrophone 180 and the accelerometers 380 present in the sensor component 150 preferably comprise wraps 615, 625, 635 and 645 of optical fiber as schematically shown. When bounded by a pair of fiber Bragg gratings 610, 620, 630, and 640, the wraps 615, 625, 635 and 645 can act as sensors, in either an interferometric, time-of flight, or other arrangement. These principles, and the optical physics of Bragg gratings, are well known and are therefore only briefly explained. Essentially, for any given wrap (e.g., 615), the reflected signals coming from each of Bragg gratings in the pair (e.g., 610) can be assessed to determine even the slightest changes in the length of the wrap, which can then be converted to useful information regarding the parameter being detected, such as seismic activities or wellbore acoustics, again, which is well known. Because the Bragg gratings are suitably transmissive, the gratings 610, 620, 630, and 640 can be connected together on the same optical fiber, e.g., in a wavelength division multiplexing (WDM) or time division multiplexing (TDM) configuration, such that the reflections from the various gratings don't interfere with one another. Although not strictly necessary, if each wrap 615, 625, 635, and 645 is bounded by a grating 610, 620, 630, 640 with a unique Bragg reflection wavelength, as is shown ($\lambda_1, \lambda_2, \lambda_3,$ and $\lambda_4$ respectively), it becomes relatively easy to understand which reflection is coming from which wrap, and hence to resolve the dynamics of the wraps from one another. Accordingly, the wraps 615 in the hydrophone 180 and the wraps 625, 635, and 645 within the accelerometers 380 are connected in series along a common fiber optic pathway 600.

Figure 14B:
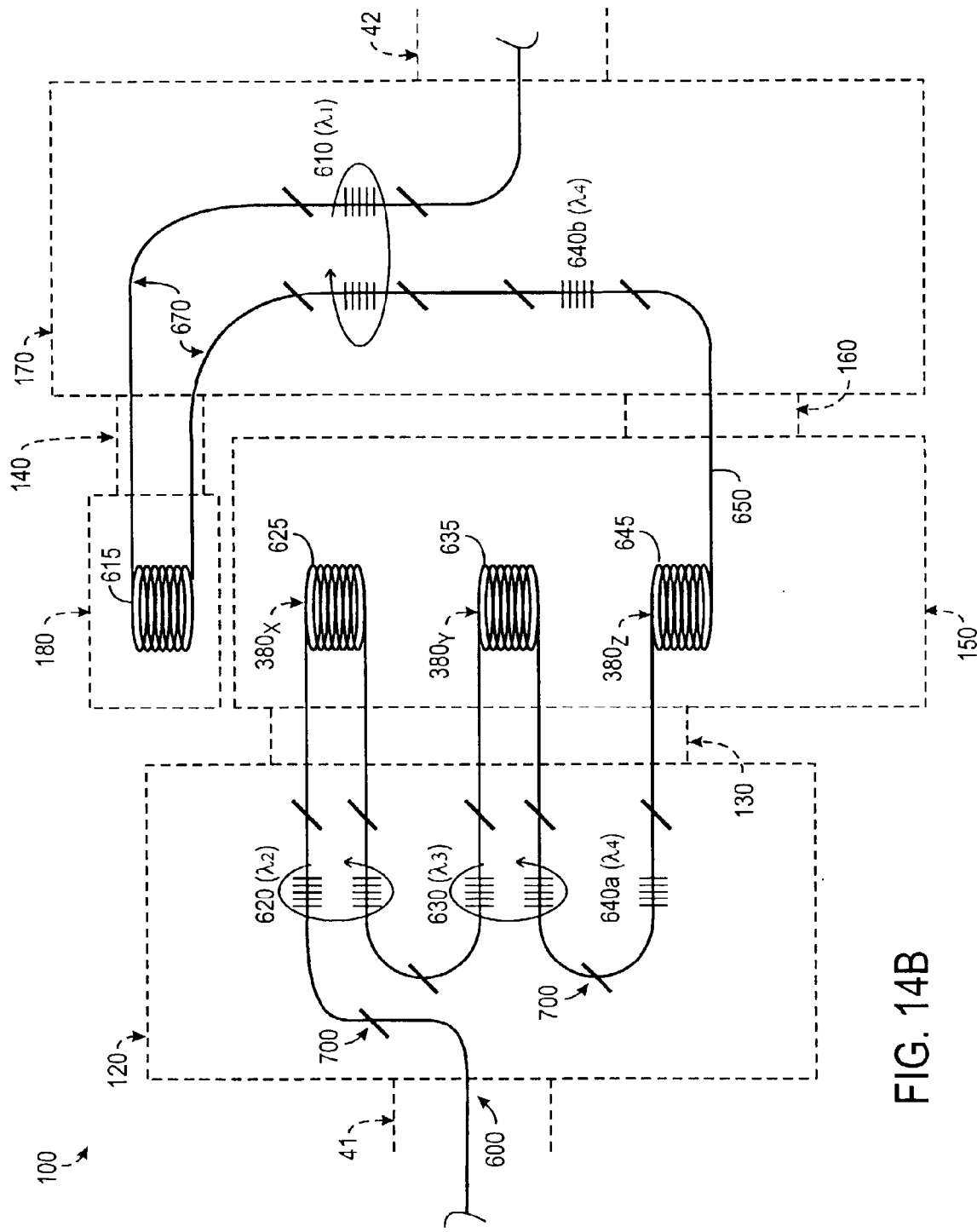

It is generally not practical to form the windings 615, 625, 635, and 645 and Bragg gratings 610, 620, 630, and 640 along a continuous piece of optical fiber. Instead the individual components, such as the inter-station cables 41, 42, the accelerometers 380, the hydrophone 180, and the Bragg gratings 610, 620, 630, and 640 are individually formed and then coupled or spliced together. As noted earlier, coupling of the optical fiber adds optical loss into the circuit and hence is not preferred, especially if the circuit is to continue to a plurality of other sensors stations. Accordingly, it is preferred to splice these components together, which provides a lower loss and generally mechanically stronger connection. The numerous splices in FIGS. 14A–B are denoted by a slanted slash mark having reference numeral 700.

Optical fiber splicing is well known in the art, and is only briefly described here. Preferably, a process such as fusion splicing is used to ensure optimal signal quality in the spliced fibers. As is known in the art, a fusion splice is made by using an electric arc to ionize the space between prepared optical fibers to eliminate air and to heat the fibers to 2,000° F. The heated fibers take a semi-liquid form and meld together, producing a single fused fiber as opposed to merely two joined fibers. The fusion splice can then be covered with a plastic sleeve or protective device (not shown), which are known in the art. While fusion splicing is preferred in the context of the present disclosure, other splicing techniques are known and may likewise be used. It will be understood that splices after they are performed can be covered, or "recoated," by a sleeve or polymer.

Accordingly, the individual optical components (Bragg gratings 610, 620, 630, and 640 and wraps 615, 625, 635, and 645) are individually fabricated and will contain loose ends of optical fiber that need to be spliced together by an assembler. Generally, the assembler will need these loose ends to be as long as possible to maximize the ease of handling and integrating such varying individual components. In some circumstances, such loose ends will need to be formed by the assembler. For example, the assembler may need to cut a suitable length of inter-station cable 41, 42, and cut opening its buffering layers to expose a suitable length of optical fiber so that splicing can be performed. Alternatively, the assembler can pre-splice a length of optical fiber on the individual components to make them easier to work with. In any event, leaving suitable lengths of optical fiber to ease the splicing assembly process means that, after the splices 700 are formed, long stretches of optical fiber are left exposed, and must be housed, particularly where, as in a downhole application, the optical circuit will be exposed to harsh environments. This is the basic purpose of the first and second splice components 120, 170 disclosed herein.

Accordingly, as can be seen in FIG. 14A, numerous splices 700 are performed to couple the various optical components together. (Any splices related to merely lengthening the working length of the various components, while possibly present, are not illustrated). As will be understood, two splice components 120, 170 are preferred because a splice 700 is preferably made at both ends of the sensor component 150 to the upper inter-station cable 41 and the lower inter-station cable 42. However, this is not strictly necessary, as all of the splices 700 could be routed into one or other of the splice components 120 or 170, which would then have be coupled to both cables 41, 42. Such an alternative orientation is not presently preferred because it would disturb the generally linear nature of the sensor mechanism 100, and hence its desired low profile.

When splicing the fiber Bragg gratings 610, 620, 630, and 640, the ends of the gratings can be directly coupled, as shown at splice 700*a*. Alternatively, an extra length of optical fiber can be positioned between gratings and coupled. For example, splices 700*b* couple an extra length of optical fiber between gratings 610 and 620.

Having two splice components 120, 170 allows flexibility during the splicing and assembly process. For example, while FIG. 14A shows the majority of the splices 700 being formed on cable 41 side of the sensor component 150 and ultimately housed in first splice component 120, alternative arrangements are possible. For example, an alternative fiber optic pathway 650 is shown in FIG. 14B. It might be more logical to splice the last Bragg grating 640*b* on the cable 42 side and house that splice in second splice component 170 given the vicinity of the third accelerometer 380$_3$ to that side. Similarly, the splices and Bragg gratings for any of the accelerometers 380 could be housed in the second splice component 170. Or, the splices and Bragg gratings for the hydrophone 180 could be housed in the second component 140, as shown by an alternative pathway 670 in FIG. 14B, which would require that tube 140 be ported to the second splice component 170 instead of the first component 120.

Although not shown in FIGS. 14A–B, it is not necessary that all of the splices in the sensor mechanism 100 appear in the first or second splice components 120, 170. For example, the fiber Bragg gratings 610, 620, 630, and 640 could be formed before the accelerometers 380 are placed inside of the body of the sensor component 150. In this regard, excess cable resulting from these splices can be housed in the sensor component 150 itself, and specifically in conjunction with the fiber supports 382 and polyamide tubes 384 (see FIGS. 8A–B).

Moreover, the disclosed design allows for an optical fiber to merely pass through the sensor mechanism 100, which, as mentioned earlier, may be necessary in situations in which signal attenuation from the gratings would prevent all of the sensor mechanisms in an array from being multiplexed together. In this regard, alternative optical pathway 660 in FIG. 14A merely constitutes an optical fiber that is being passed through the sensor mechanism 100. Although not reiterated here, the reader is reminded of the discussions with reference to FIGS. 8–12 that reveal that routing of the optical fiber within the various components can occur in many different ways and through many different portions of the device. It should be clear that any given conduit or tube in the disclosed device can pass numerous portions of optical fiber.

Figure 15:
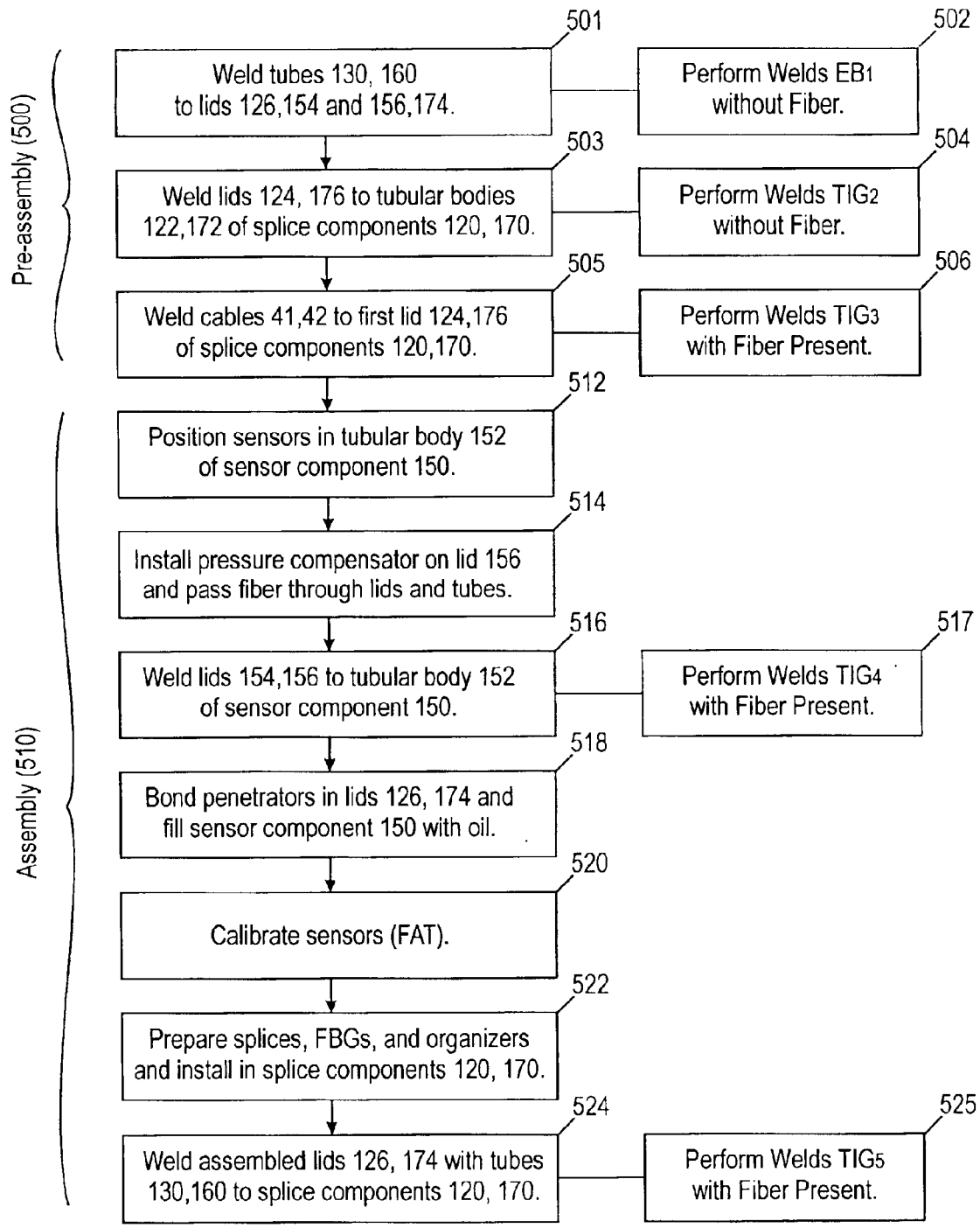
FIG. 15 illustrates exemplary steps in assembling the disclosed sensor mechanism.

Referring to FIG. 15, exemplary steps in assembling a multiple component sensor mechanism 100 according to this disclosure is now discussed, using primarily the element numerals from FIG. 3. In the steps that follow, minor steps well understood by those skilled in the art are omitted. For example, it should be understood that optical fibers require careful procedures when handling so as not to compromise the integrity of the fibers. Accordingly, variously shaped jigs will preferably be used. Also omitted for clarity is a discussion of the connection of the hydrophone, which should likewise be clear given the discussion of the other components.

A number of pre-assembly steps 500 are preferably performed on some of the components to minimize the hazard to the fibers. Thus, the tubes 130 and 160 are first welded to the lids 126, 154 and 156, 174, respectively, preferably by Electron Beam (EB) welding (501). Because these welds $EB_1$ preferably take place before the fibers are introduced into the assembly, there are no restrictions to heating and the parts can be easily handled and transported (502). As is known in the art, Electron Beam (EB) welding is done in a high vacuum chamber by mechanized equipment, and yields a low distortion weld having high integrity. A high integrity weld is preferred because the connection of the thin capillary tubes 130, and 160 to the much larger lids 126, 154, 156, and 174 can present a weak point in the sensor mechanism susceptible to damage from tension, torsion, or pressure. Because the coating on the optical fibers to be ultimately passed through the tubes is only a few microns thick and is vulnerable to sharp edges and rough surfaces, it may be necessary to smooth the inner surfaces the fibers are expected to contact.

Next in the pre-assembly, the lids 124, 176 are welded to the tubular bodies 122, 172 of the first and second splice components (503). These welds are preferably tungsten-inert-gas welds $TIG_2$ and again are preformed without fibers present (504). As is known in the art, tungsten-inert-gas (TIG) welding is also known as gas tungsten arc welding, GTAW, or HELIARC, which is a tradename of Linde. TIG welding can be performed using a welding machine, such as available from ARC Machines, Inc. TIG welding is a welding process where heat is generated from an electric arc maintained between a non-consumable tungsten electrode and the part being welded. A shield of inert gas, such as Argon, is used to prevent rapid oxidation of the weld and surrounding metal. Because of gas shield does not produce the slag that normally is created by flux, the danger of slag inclusion in the weld metal is eliminated. Due to the slow speed of the TIG process, gases and other impurities can escape to the surface before solidification of the weld occurs, eliminating pockets or "porosity" common in weld processes that employ gas shielding but have greater travel speeds than the TIG process. TIG also produces a weld with reduced stress, cracking, and distortion, which is suitable for the high-pressure requirements of the disclosed sensor mechanism. TIG welding is also beneficial because it can be performed orbitally, which facilitates the welding of the cylindrical structures disclosed herein. As one skilled in the art will understand, care should be taken during TIG welding to ensure that any jigs associated with the assembly process do not sink too much heat (which could lead to an inferior weld) or too little heat (which could damages the optical fibers).

In a final step of pre-assembly, sections of inter-station cables 41, 42 are then welded to the lids 124, 126, again preferably by TIG welding (505). Because the lids 124, 126 have already been welded to the bodies 122, 172, excess lengths of optical fiber in the cables 41, 42 need to be exposed and passed through the bodies 122, 172 with suitable length for subsequent splicing. The welds $TIG_3$ in this welding step thus takes place with the fibers present, and hence precautions need to be taken to ensure that the fiber is not damages by the heat generated by the welding process (506). As is known, optical fiber is composed of silica having a polyamide coating that is vulnerable to heat. However, TIG welding produces a welding heat that is substantially confined between the weld and the base metal at the point of fusion so that a narrow heat affected zone is produced.

After pre-assembly, a number of assembly steps are performed (510). Assembly first involves positioning the one or more sensors into the tubular body 152 of the sensor component 150 (512). When installing the sensors in the tubular body 152 both ends of the body 152 are open and the extended fibers from the accelerometers are placed through the appropriate end with consideration to which of the splice chambers 120, 170 the accelerometers will be spliced. As noted above with reference to FIGS. 8A–12, the sensors are installed with wedging devices.

Next, the pressure compensator is installed on one of the lids 154, 156 for the sensor component 150 (514). As noted above with reference to FIGS. 8A–B, the pressure compensator allows the oil in the sensor component to thermally expand. Optical fibers from the accelerometers in the sensors component 150 (and/or other cable sections which might merely be passing through the sensor component) are then passed through the penetrators in the lids 154 and 156, which are already welded to the tubes 130, 160, and which are in turn already welded to the lids 126, 174 (514). Again, the accelerometers need to have fibers of sufficient length to reach through to the lids 126, 174, with suitable extra length to spare to facilitate splicing.

Finally, the lids 154 and 156 are preferably TIG welded to the ends of the tubular body 152 of the sensor component 150 (516). Because fibers are present at the weld locations, the welds $TIG_4$ should be performed with care. To assist with respect to these welds $TIG_4$, and as mentioned earlier, the lids 154 and 156 preferably have shoulders that dispose relatively deeply within the body 152. The pressure fit between the shoulders of the lids 154 and 156 and the tubular body 152 can reduce the required welding depth and can thereby reduce the maximum temperature achieved during welding. Heat sinks may be required to control heating of the tubular body 152 and lids 154 and 156 during the welding process.

Next, the penetrators in the lids 126 and 174 are sealed with the necessary optical fiber placed therethrough, and the sensor component 150 is then filled with oil via the lids 126 and 174 and tubes 130 and 160 (518). The sensor is calibrated using a Factory Acceptance Test (FAT) (520).

Next, fiber Bragg gratings and splices of the optical fiber(s) emanating from the sensor mechanism 150 through tubes 130, 160 and from cables 41, 42 out the open end of the bodies 122, 172 are prepared. The optical fiber(s) are spliced into a desired optical circuit. The spliced fiber(s) are then organized onto fiber organizers 240 (see FIG. 6), which at this point are unenclosed. The fiber(s) can be appropriately organized, for example, by winding fiber around the winding members 248. Splices, should they contain larger sleeves or recoat material not susceptible to winding, can be adhered to the fiber organizers 240 in their trays 242. Thereafter, fiber-stacking devices 280 can be affixed to the top of the fiber organizers 240, although the devices 280 may not be strictly necessary. At a convenient point during the fiber organization process, the fiber organizer 240 is affixed to the lids 126, 174 as shown in FIGS. 6A and 7A. Even if organization is as efficient as possible, when it comes time to stick the lids 126, 174 into the bodies 122, 172 some amount of fiber slack will probably still remain. Such excess slack can be pushed into the gap provided by the fiber-stacking devices 280 while the lids 126, 174 are slid into place within the bodies 122, 172.

Finally, the lids 126, 174 for the splice components 120, 170 are preferably TIG welded to the tubular bodies 122, 172 of the splice components (524). Because fiber is present at the location of the welds $TIG_5$, precautions noted earlier should again be taken.

Figure 16:
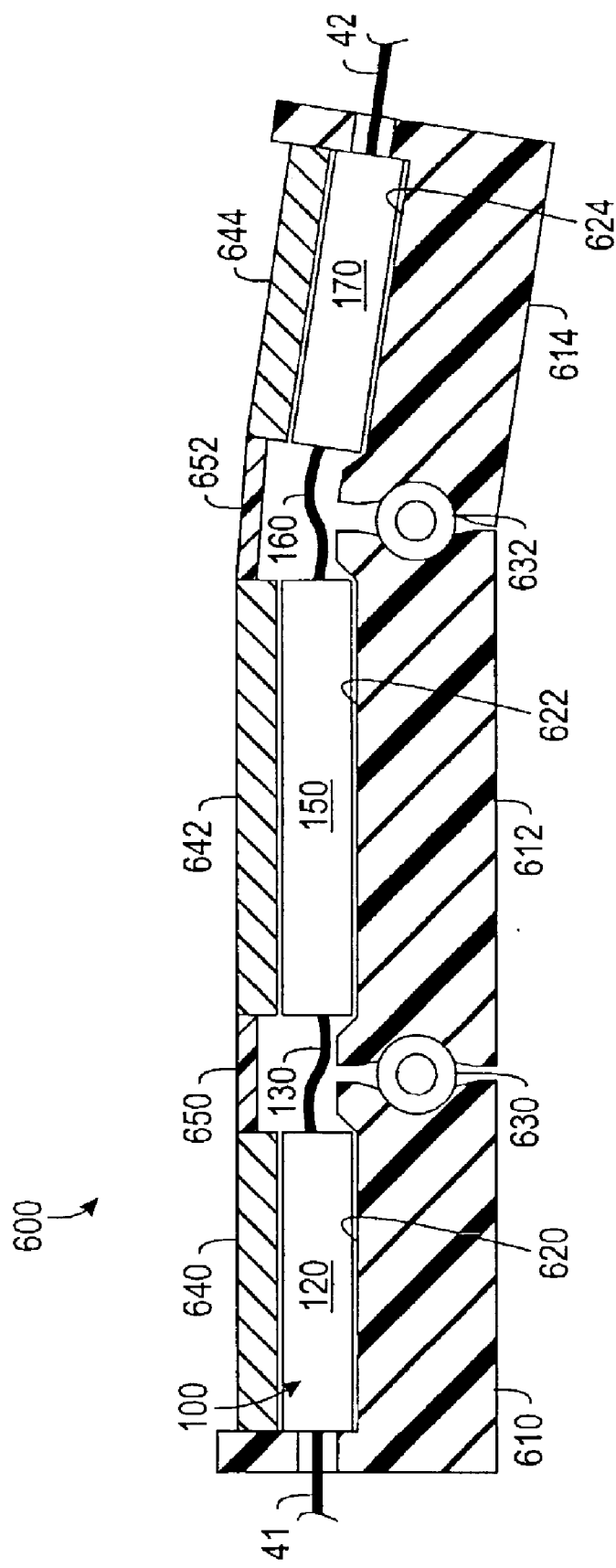
FIG. 16 illustrates an embodiment of a transportation receptacle for the disclosed sensor mechanism.

Referring to FIG. 16, an embodiment of a transportation receptacle 600 for the disclosed sensor mechanism 100 is schematically illustrated in cross-section. In many applications, a large number of sensors may be used. For example, as many as 50 to 100 sensor mechanisms 100 can be used in the construction of an in-well seismic array. As noted, because fiber optic connectors generate loss and back reflection, the number of connectors is preferably minimal in an array of sensor mechanisms, and it is therefore not preferred that each sensor mechanism in the array use an optical coupler to connect to the next sensor mechanism in the array. Instead, an array of sensor mechanisms are preferably assembled as discussed above and transported to a work site on a drum.

To facilitate winding on a standard cable drum, the components can be secured in a transportation receptacle 600. The transportation receptacle 600 is used to hold, protect, and transport the disclosed sensor mechanism 100 and facilitates field installation. In a preferred embodiment, the transportation receptacle 600 is used with a system and method as disclosed in U.S. patent application Ser. No. 10/266,715, entitled "Apparatus and Method for Transporting, Deploying, and Retrieving an Array Having Nodes Interconnected by Sections of Cable," which is incorporated herein.

The receptacle 600 holds the components 120, 150, and 170 firmly and substantially eliminates the transfer of tension to the tubes 130 and 160 during handling and transportation. The components 120, 150, and 170 are secured by the receptacle 600 until they can be securely mounted in a device, such as a clamp incorporated herein. To allow a large number of sensors on the drum, the receptacle 600 is flexible and small.

The transportation receptacle 600 includes three sections 610, 612, and 614, which can be made of hard plastic that is injection molded or milled to shape, for example. Metal wires or other structures can be included to increase the pulling strength and dimensional stability from one end of the receptacle 600 to the other. The sections 610, 612, and 614 define recesses 620, 622, and 624 for housing the components 120, 150, and 170, respectively.

The sections 610, 612, and 614 are connected together by hinges 630 and 632. Because the sensor component 150 and splice components 120 and 170 are stiff, the bending points of the hinges 630 and 632 are provided between the components at the location of tubes 130 and 160. Covers 640, 642, and 644 are connected to the sections 610, 612, and 614 to securely hold the components 120, 150, and 170 within the recesses 620, 622, and 624. Flexible covers 650 and 652 are provided between the covers 620, 622, and 624 of the sections where the tubes 130 and 160 are positioned to protect them. The hinges 630 and 632 allow a limited degree of flexure to the receptacle 600, allowing the receptacle 600 to be wound on a cable drum without damage to the relatively delicate tubes 130 and 160. The attachment of the splice components 120 and 170 to the cables 41 and 42 is rugged and can accept the tension and torsion that can be expected during winding on the transportation and installation drum, and the later handling during completion.

Although not shown in FIG. 16, one of ordinary skill in the art will appreciate that the recesses 620, 622, and 624 can be configured to hold additional components mounted on the components 120, 150, and 170 of the sensor mechanism 100, such as the hydrophone disclosed earlier. For example, mounting brackets, covers, and other members (not shown) of a device intended to hold the sensor mechanism 100, such as the in-well seismic clamp incorporated herein, can be pre-attached to the components 120, 150, and 170 and installed in the recesses 620, 622, and 624.

One of ordinary skill in the art will appreciate that the teachings of the present disclosure can be used with a number of arrays having a plurality of sensors interconnected by sections of cable and can be used in other applications beyond in-well seismic sensing. For example, the disclosed multiple component sensor mechanism could be used in a number of sea-bed and land applications, including geophysical streamer cables, hydrophone and thermistor arrays, ocean bottom cables, towed hydrophone arrays, or other arrays. These applications can suffer from many of the same problems associated with using fiber optic based sensors used in in-well seismic sensing. Namely, these applications may require numerous sensors, and the use of fiber optic connectors may be preferably minimized to reduce signal loss and back reflection. Consequently, for these applications, it may also be beneficial to pre-assemble the entire array or the sensor mechanism thereof before transportation to a site. Accordingly, the present invention is directed to a multiple component sensor mechanism capable of being pre-assembled and used in numerous applications and environments.

While the disclosed system preferably uses three separate components 120, 150, and 170, it should be noted that this is not strictly necessary. Instead, if the sensor component 150 is made long enough, the splices on either end could be housed within the body 152 of the sensor component. In other words, the splices and/or associated Bragg gratings could be tuck backed into the housing for the ends of the body 152, which may also contain room for the fiber organizer 240 and fiber stacking device 280 disclosed herein. After positioning the splices in either or both ends of the body 152, lids could be welded to the ends and the inter-station cables 41, and 42 in turn welded to those ends. In short, this alternative design would allow the sensors and the splices to reside in a single tubular body, and without the need for separate splice components. In this alternative embodiment, the sensor component could still be filled with oil, which would not damage the splices now contained therein. Moreover a hydrophone could be ported from the middle or from the lids of the sensor component should that be desirable. As it may be useful to deploy the sensor mechanism away from the inter-station cables 41, 42, as in the active clamp embodiment incorporated herein, it may be advantageous to weld more flexible tube (such as tubes 130, 160) between the lids of the sensor component and the inter-station cables 41, 42. In short, the disclosed technique lends itself to many useful forms. In short, this single body embodiment can be viewed as an integration of the sensor component body and the splice component bodies.

As used herein, "coupled" should not be construed as requiring a direct connection. Intermediary components can be present between two components and these may still be considered to be "coupled." For example, the second accelerometer 380y can be said to be "coupled" to the first inter-station cable 41, even though the first accelerometer 380x and its associated fiber Bragg gratings intervenes between the two.

A "sensor" is said to be located where its sensitive portion is located. Therefore, in the context of the present disclosure, the fiber optic wraps whose length is modulated to detect an event of interest, such as the wraps of the accelerometers 380 or of the hydrophone 180, is located in their respective housings 150, 400. Thus, these "sensors" can be said to be "located" or "contained" within those housings, even though the Bragg gratings that bound them are located within a splice component. By contrast, if the Bragg grating themselves are used as the sensitive portions, for example, if an event is detected by assessing a Bragg reflection wavelength shift, then such a sensor will be understood to be "located" or "contained" in the housing for the Bragg grating.

It is intended that the invention include all such modifications and alterations to the full extent that they come within the scope of the following claims or the equivalents thereof.

What is claimed is:

1. A fiber-optic-based sensor system coupled to a first transmission line comprising a first fiber optic cable contained within a first sleeve, the system comprising:
   a second housing comprising at least one fiber optic sensor coupled to a second fiber optic cable;
   a first housing, wherein the first sleeve is coupled to the first housing, and wherein the first housing contains a first splice which couples the first fiber optic cable to the second fiber optic cable; and
   a flexible tube between the first and second housings, the flexible tube containing the second fiber optic cable and enabling acoustic decoupling of the second housing spaced from the first housing.

2. The system of claim 1, wherein either the first or second housings are cylindrical.

3. The system of claim 1, wherein the first housing contains a means for organizing the splice.

4. The system of claim 1, wherein the second housing is oil filled.

5. The system of claim 1, wherein the first sleeve is coupled to the first housing by welding.

6. The system of claim 1, wherein the first housing is further coupled to at least one fiber optic auxiliary sensor.

7. The system of claim 6, wherein the first housing further comprises a second splice which couples the auxiliary sensor to the first fiber optic cable.

8. The system of claim 7, wherein the auxiliary sensor is a hydrophone.

9. The system of claim 1, wherein the first housing further comprises at least one second splice to couple a fiber Bragg grating to the first fiber optic cable.

10. The system of claim 1, wherein the system is further coupled to a second transmission line comprising a third fiber optic cable contained within a second sleeve, and wherein the at least one fiber optic sensor is coupled to a fourth fiber optic cable on an opposite end of the at least one sensor from the second fiber optic cable, the system further comprising:
   a third housing, wherein the second sleeve is coupled to the third housing, and wherein the third housing contains a second splice which couples the third fiber optic cable to the fourth fiber optic cable.

11. The system of claim 10, wherein either the first, second or, third housings are cylindrical.

12. The system of claim 10, wherein the first housing is rigidly coupled to the third housing.

13. The system of claim 10, wherein the first and third housings are integrated.

14. The system of claim 10, wherein the first and third housings are coupled by a flexible tube containing the second fiber optic cable.

15. The system of claim 10, wherein the third housing contains a means for organizing the splice.

16. The system of claim 10, wherein the second housing is oil filled.

17. The system of claim 10, wherein the second sleeve is coupled to the first and third housings by welding.

18. The system of claim 10, wherein the third housing is further coupled to at least one fiber optic auxiliary sensor.

19. The system of claim 18, wherein the third housing further comprises a second splice which couples the auxiliary sensor to the third fiber optic cable.

20. The system of claim 19, wherein the auxiliary sensor is a hydrophone.

21. The system of claim 10, wherein the third housing further comprises at least one second splice to couple a fiber Bragg grating to the third fiber optic cable.

22. A fiber-optic-based sensor system coupleable to a fiber optic transmission line, comprising:
   a sensor housing comprising at least one fiber optic senor;
   a splice housing containing at least one first splice which couples the at least one fiber optic sensor to the fiber optic transmission line; and
   a fiber organizer for disposal in the splice housing, wherein the fiber organizer provides winding members for winding optical fiber thereon.

23. The system of claim 22, wherein the splice and sensor housings are cylindrical.

24. The system of claim 22, wherein the splice housing is rigidly coupled to the sensor housing.

25. The system of claim 22, wherein the splice and sensor housings are integrated.

26. The system of claim 22, wherein the splice housing is coupled by a flexible tube to the sensor housing.

27. The system of claim 26, wherein the flexible tube and the sensor housing are filled with oil.

28. The system of claim 22, wherein the fiber organizer includes a tray defining a separated area within the splice housing adjacent the winding members.

29. The system of claim 22, wherein the fiber optic transmission line is welded to the splice housing.

30. The system of claim 22, wherein the splice housing is further coupled to at least one fiber optic auxiliary sensor.

31. The system of claim 30, wherein the splice housing further comprises a second splice which couples the auxiliary sensor to the fiber optic transmission line.

32. The system of claim 31, wherein the auxiliary sensor is a hydrophone.

33. The system of claim 22, wherein the splice housing further comprises at least one second splice to couple a fiber Bragg grating to the fiber optic transmission line.

34. The system of claim 22, wherein the at least one sensor comprises at least one accelerometer.

35. The system of claim 22, wherein there are three sensors oriented to along three orthogonal axes.

36. A method for manufacturing a fiber-optic-based sensor, comprising:
  (a) positioning a plurality of sensors within a sensor housing, wherein each sensor comprises an input fiber optic cable and an output fiber optic cable;
  (b) bringing any combination of the input and output fiber optic cables to first and second ends of the sensor housing;
  (c) splicing the fiber optic cables brought to the first end of the sensor housing to form at least one first splice;
  (d) splicing the fiber optic cables brought to the second end of the sensor housing to form at least one second splice; and
  (e) wrapping the fiber optic cables at each end of the sensor housing on respective fiber organizers prior to placing the fiber organizers in splice housings, the splice housings for housing the at least one splice and the at least one second splice.

37. The method of claim 36, further comprising placing remaining unwrapped fiber optic cables on a fiber stacking device of the fiber organizers.

38. The method of claim 36, wherein the first and second splices connect the sensors in series.

39. The method of claim 36, wherein the sensors comprises accelerometers oriented along orthogonal axes.

40. A method for manufacturing a fiber-optic-based sensor system, comprising in no particular order:
  (a) affixing a first fiber optic transmission line containing a first fiber optic cable to a first end of a first housing, wherein the first fiber optic cable is exposed at a second end of the first housing;
  (b) positioning at least one sensor containing a second fiber optic cable within a second housing, wherein the second fiber optic cable is exposed at a first end of the first housing;
  (c) splicing the first and second fiber optic cables to form a splice;
  (d) placing the splice in the first housing; and
  (e) acoustically decoupling the second housing from the first housing by spacing the housings from one another and connecting the housings by a flexible tube containing the second fiber optic cable.

41. The method of claim 40, further comprising, before step (d), organizing the splice on a fiber organizer.

42. The method of claim 41, wherein placing the splice in the first housing comprises placing the fiber organizer in the first housing.

43. The method of claim 40, wherein the sensors comprises accelerometers oriented along orthogonal axes.

44. The method of claim 40, wherein the at least one sensor further comprises a fourth fiber optic cable, the method further comprising:
  (a) affixing a second fiber optic transmission line containing a third fiber optic cable to a first end of a third housing, wherein the third fiber optic cable is exposed at a second end of the third housing;
  (b) exposing the fourth fiber optic cable at a second end of the second housing;
  (c) splicing the third and fourth fiber optic cables to form a splice; and
  (d) placing the splice in the third housing.

45. The method of claim 44, wherein the second and third housings are connected by a tube containing the second fiber optic cable.

46. The method of claim 44, further comprising, before step (d), organizing the splice on a fiber organizer.

47. The method of claim 46, wherein placing the splice in the third housing comprises placing the fiber organizer in the first housing.

48. The method of claim 44, wherein the sensors comprises accelerometers oriented along orthogonal axes.

49. A sensor component, comprising:
  a tubular body having a central axis, comprising:
    a pressure regulator for regulating the pressure within the tubular body;
    a first fiber-optic-based accelerometer with an elongate body positioned along the central axis within the tubular body, wherein the first accelerometer detects acceleration in a first axis orthogonal to the central axis;
    a second fiber-optic-based accelerometer with an elongate body positioned along the central axis within the tubular body, wherein the first accelerometer detects acceleration in a second axis orthogonal to both the first axis and the central axis; and
    a third fiber-optic-based accelerometer with an elongate body positioned along the central axis within the tubular body, wherein the first accelerometer detects acceleration in an axis parallel to the central axis,
  wherein the first, second, and third fiber-optic-based accelerometers are multiplexed along a single optical pathway.

50. The method of claim 49, wherein the tubular body is filled with oil.

51. The component of claim 49, wherein the pressure regulator comprises a bladder.

52. The component of claim 49, further comprising wedges for holding the first, second, and third accelerometers within the tubular body.

* * * * *